US008531286B2

(12) United States Patent
Friar et al.

(10) Patent No.: US 8,531,286 B2
(45) Date of Patent: Sep. 10, 2013

(54) SYSTEM AND METHOD FOR MONITORING SECURITY AT A PREMISES USING LINE CARD WITH SECONDARY COMMUNICATIONS CHANNEL

(75) Inventors: Gary Friar, Saint Cloud, FL (US); Mark Davis, Lake Oswego, OR (US)

(73) Assignee: Stanley Convergent Security Solutions, Inc., Naperville, IL (US)

( * ) Notice: Subject to any disclaimer, the term of this patent is extended or adjusted under 35 U.S.C. 154(b) by 1106 days.

(21) Appl. No.: 12/204,019

(22) Filed: Sep. 4, 2008

(65) Prior Publication Data

US 2009/0058630 A1 Mar. 5, 2009

Related U.S. Application Data

(60) Provisional application No. 60/969,990, filed on Sep. 5, 2007.

(51) Int. Cl.

| | |
|---|---|
| ***G08B 29/00*** | (2006.01) |
| ***G08B 1/00*** | (2006.01) |
| ***H04Q 1/30*** | (2006.01) |

(52) U.S. Cl.

USPC ................. 340/506; 340/539.16; 340/539.17; 340/531; 379/37; 379/41; 379/166; 370/359; 370/419

(58) Field of Classification Search

USPC ......................................................... 340/506

See application file for complete search history.

(56) References Cited

U.S. PATENT DOCUMENTS

| | | | |
|---|---|---|---|
| 3,074,053 | A | 1/1963 | McDonough et al. |
| 3,109,165 | A | 10/1963 | Bagno |
| 3,383,678 | A | 5/1968 | Palmer |
| 3,404,393 | A | 10/1968 | Blivice et al. |
| 3,437,759 | A | 4/1969 | McKinzie |
| 3,461,241 | A | 8/1969 | Menke |
| 3,488,436 | A | 1/1970 | Burney |
| 3,537,095 | A | 10/1970 | Cones |
| 3,573,817 | A | 4/1971 | Akers |
| 3,610,822 | A | 10/1971 | Ingham et al. |
| 3,662,112 | A | 5/1972 | Martin |
| 3,833,897 | A | 9/1974 | Bell et al. |
| 3,838,408 | A | 9/1974 | McMaster |
| 3,883,695 | A | 5/1975 | Bickel et al. |
| 4,001,771 | A | 1/1977 | Amrine et al. |

(Continued)

FOREIGN PATENT DOCUMENTS

| | | |
|---|---|---|
| EP | 1014325 | 6/2000 |
| JP | 6282782 | 10/1994 |

(Continued)

*Primary Examiner* — Donnie L Crosland

(74) *Attorney, Agent, or Firm* — Faegre Baker Daniels LLP

(57) ABSTRACT

A security system includes at least one audio sensor and an alarm panel that transmits alarm report data through a communications network to at least one alarm receiver located at a central station remote from the premises that receives the alarm report data transmitted from the alarm panel through the communications network. A line card receives the alarm report data. An alarm receiver processor receives and processes regulated alarm report data in accordance with Underwriter Laboratories 1610 requirements. The line card is operable for receiving non-regulated alarm report data that is not regulated in accordance with Underwriter Laboratories 1610 requirements. The line card includes a secondary communications channel interfaced to a central station automation system and routes the regulated alarm report data to the central station automation system over the secondary communications channel and bypasses the alarm receiver processor.

25 Claims, 19 Drawing Sheets

(56) References Cited

U.S. PATENT DOCUMENTS 4,023,139 A 5/1977 Samburg
4,060,803 A 11/1977 Ashworth, Jr.
4,241,335 A 12/1980 Barnes
4,249,207 A 2/1981 Harman et al.
4,283,717 A 8/1981 Caldwell et al.
4,321,593 A 3/1982 Ho et al.
4,333,170 A 6/1982 Mathews et al.
4,538,139 A 8/1985 Clemente
4,633,234 A 12/1986 Gagnon
4,706,069 A 11/1987 Tom et al.
4,707,604 A 11/1987 Guscott
4,709,151 A 11/1987 Guscott et al.
4,728,935 A 3/1988 Pantus et al.
4,728,936 A 3/1988 Guscott et al.
4,749,871 A 6/1988 Galvin et al.
4,758,827 A 7/1988 Powers
4,796,025 A 1/1989 Farley et al.
4,812,820 A 3/1989 Chatwin
4,821,027 A 4/1989 Mallory et al.
4,827,247 A 5/1989 Giffone
4,839,640 A 6/1989 Ozer et al.
4,843,462 A 6/1989 Roy et al.
4,850,018 A 7/1989 Vogt
4,853,685 A 8/1989 Vogt
4,857,912 A 8/1989 Everett, Jr. et al.
4,876,597 A 10/1989 Roy et al.
4,893,328 A 1/1990 Peacock
4,952,931 A 8/1990 Serageldin et al.
5,023,901 A 6/1991 Sloan et al.
5,091,780 A 2/1992 Pomerleau
5,109,278 A 4/1992 Erickson et al.
5,111,291 A 5/1992 Erickson et al.
5,144,661 A 9/1992 Shamosh et al.
5,150,099 A 9/1992 Lienau
5,168,262 A 12/1992 Okayama
5,173,932 A 12/1992 Johansson et al.
5,249,223 A 9/1993 Vanacore
5,398,277 A 3/1995 Martin, Jr. et al.
5,400,011 A 3/1995 Sutton
5,406,254 A 4/1995 Le Nay et al.
5,436,610 A 7/1995 Ballesty et al.
5,471,194 A 11/1995 Guscott
5,506,567 A 4/1996 Bichlmaier et al.
5,513,244 A 4/1996 Joao et al.
5,532,670 A 7/1996 Issa et al.
5,534,845 A 7/1996 Issa et al.
5,543,783 A 8/1996 Clark et al.
5,555,404 A 9/1996 Torbjørnsen et al.
5,557,254 A 9/1996 Johnson et al.
5,629,687 A 5/1997 Sutton et al.
5,646,591 A 7/1997 Issa et al.
5,675,320 A 10/1997 Cecic et al.
5,680,096 A 10/1997 Grasmann
5,682,133 A 10/1997 Johnson et al.
5,736,927 A 4/1998 Stebbins et al. .............. 340/506
5,751,209 A 5/1998 Werner et al.
5,783,989 A 7/1998 Issa et al.
5,784,323 A 7/1998 Adams et al.
5,798,711 A 8/1998 Issa et al.
5,812,054 A 9/1998 Cohen
5,815,198 A 9/1998 Vachtsevanos et al.
5,818,334 A 10/1998 Stanley
5,862,201 A 1/1999 Sands
5,862,527 A 1/1999 Trevino
5,872,519 A 2/1999 Issa et al.
5,886,620 A 3/1999 Stewart et al.
5,900,806 A 5/1999 Issa et al.
5,914,655 A 6/1999 Clifton et al.
5,914,667 A 6/1999 Issa et al.
5,917,405 A 6/1999 Joao
5,917,410 A 6/1999 Cecic et al.
5,917,775 A 6/1999 Salisbury
5,952,933 A 9/1999 Issa et al.
5,956,424 A 9/1999 Wootton et al.
5,963,662 A 10/1999 Vachtsevanos et al.
5,986,543 A 11/1999 Johnson
5,986,544 A 11/1999 Kaisers et al.
5,990,786 A 11/1999 Issa et al.
6,028,522 A 2/2000 Petite
6,038,289 A 3/2000 Sands
6,069,655 A 5/2000 Seeley et al.
6,078,253 A 6/2000 Fowler
6,081,193 A 6/2000 Trucchi et al.
6,091,771 A 7/2000 Seeley et al.
6,094,134 A 7/2000 Cohen
6,097,429 A 8/2000 Seeley et al.
6,215,404 B1 4/2001 Morales
6,218,953 B1 4/2001 Petite
6,236,313 B1 5/2001 Eskildsen et al.
6,246,322 B1 6/2001 LeDain et al.
6,265,971 B1 7/2001 Maier, Jr. et al.
6,269,179 B1 7/2001 Vachtsevanos et al.
6,281,789 B1 8/2001 Furtado et al.
6,281,790 B1 8/2001 Kimmel et al.
6,300,872 B1 10/2001 Mathias et al.
6,313,744 B1 11/2001 Capowski et al.
6,317,034 B1 11/2001 Issa et al.
6,335,976 B1 1/2002 Belmares
6,351,214 B2 2/2002 Eskildsen et al.
6,363,079 B1 * 3/2002 Barzegar et al. .............. 370/465
6,369,705 B1 4/2002 Kennedy
6,426,697 B1 7/2002 Capowski et al.
6,433,683 B1 8/2002 Robinson
6,437,096 B1 8/2002 Myers et al.
6,437,692 B1 8/2002 Petite et al.
6,459,370 B1 10/2002 Barrieau et al.
6,492,905 B2 12/2002 Mathias et al.
6,493,687 B1 12/2002 Wu et al.
6,504,479 B1 1/2003 Lemons et al.
6,507,278 B1 1/2003 Brunetti et al.
6,507,790 B1 1/2003 Radomski
6,529,723 B1 3/2003 Bentley
6,538,570 B1 3/2003 Smith
6,538,689 B1 3/2003 Chang
6,542,076 B1 4/2003 Joao
6,542,077 B2 4/2003 Joao
6,549,130 B1 4/2003 Joao
6,563,910 B2 5/2003 Menard et al.
6,567,001 B1 5/2003 Barrieau et al.
6,587,046 B2 7/2003 Joao
6,591,094 B1 7/2003 Bentley
6,618,074 B1 9/2003 Seeley et al.
6,633,640 B1 10/2003 Cohen et al.
6,642,954 B1 11/2003 Parker
6,658,091 B1 12/2003 Naidoo et al.
6,690,411 B2 2/2004 Naidoo et al.
6,690,414 B2 2/2004 Lyons et al.
6,693,530 B1 2/2004 Dowens et al.
6,693,532 B2 2/2004 Capowski et al.
6,727,811 B1 4/2004 Fendis
6,741,164 B1 5/2004 Stewart et al.
6,741,171 B2 5/2004 Palka et al.
6,748,343 B2 6/2004 Alexander et al.
6,759,954 B1 7/2004 Myron et al.
6,778,084 B2 8/2004 Chang et al.
6,778,085 B2 8/2004 Faulkner et al.
6,798,344 B2 9/2004 Faulkner et al.
6,810,244 B2 10/2004 Bristow et al.
6,844,818 B2 1/2005 Grech-Cini
6,864,789 B2 3/2005 Wolfe
6,873,256 B2 3/2005 Lemelson et al.
6,888,459 B2 5/2005 Stilp
6,890,133 B2 5/2005 Singh et al.
6,917,288 B2 7/2005 Kimmel et al.
6,930,599 B2 8/2005 Naidoo et al.
6,943,682 B1 9/2005 Dowens et al.
6,950,021 B2 9/2005 Butler
6,954,137 B2 10/2005 Stewart et al.
6,954,859 B1 10/2005 Simerly et al.
6,970,183 B1 11/2005 Monroe
6,972,676 B1 12/2005 Kimmel et al.
6,975,220 B1 12/2005 Foodman et al.
7,005,971 B2 2/2006 Stewart et al.
7,015,806 B2 3/2006 Naidoo et al.

| | | | |
|---|---|---|---|
| 7,016,813 | B2 | 3/2006 | Alexander et al. |
| 7,019,633 | B1 | 3/2006 | Villa et al. |
| 7,019,639 | B2 | 3/2006 | Stilp |
| 7,023,341 | B2 | 4/2006 | Stilp |
| 7,034,677 | B2 | 4/2006 | Steinthal et al. |
| 7,042,353 | B2 | 5/2006 | Stilp |
| 7,046,985 | B2 | 5/2006 | Seales et al. |
| 7,053,764 | B2 | 5/2006 | Stilp |
| 7,057,512 | B2 | 6/2006 | Stilp |
| 7,057,764 | B1 | 6/2006 | Sakaue |
| 7,079,020 | B2 | 7/2006 | Stilp |
| 7,079,034 | B2 | 7/2006 | Stilp |
| 7,082,125 | B1 * | 7/2006 | Brent et al. .................. 370/359 |
| 7,084,756 | B2 | 8/2006 | Stilp |
| 7,091,827 | B2 | 8/2006 | Stilp |
| 7,091,832 | B1 | 8/2006 | Butterman et al. |
| 7,091,847 | B2 | 8/2006 | Capowski et al. |
| 7,093,241 | B2 | 8/2006 | Huang et al. |
| 7,095,321 | B2 | 8/2006 | Primm et al. |
| 7,103,152 | B2 | 9/2006 | Naidoo et al. |
| 7,103,176 | B2 | 9/2006 | Rodriguez et al. |
| 7,106,193 | B2 | 9/2006 | Kovach |
| 7,109,861 | B2 | 9/2006 | Rao |
| 7,119,609 | B2 | 10/2006 | Naidoo et al. |
| 7,119,658 | B2 | 10/2006 | Stilp |
| 7,120,232 | B2 | 10/2006 | Naidoo et al. |
| 7,120,233 | B2 | 10/2006 | Naidoo et al. |
| 7,130,383 | B2 | 10/2006 | Naidoo et al. |
| 7,148,797 | B2 | 12/2006 | Albert |
| 7,158,026 | B2 | 1/2007 | Feldkamp et al. |
| 7,202,789 | B1 | 4/2007 | Stilp |
| 7,203,132 | B2 | 4/2007 | Berger |
| 7,218,217 | B2 | 5/2007 | Adonailo et al. |
| 7,221,260 | B2 | 5/2007 | Berezowski et al. |
| 7,228,429 | B2 | 6/2007 | Monroe |
| 7,277,010 | B2 | 10/2007 | Joao |
| 7,283,048 | B2 | 10/2007 | Stilp |
| 7,283,789 | B2 | 10/2007 | Choi |
| 7,323,980 | B2 | 1/2008 | Faulkner et al. |
| 7,391,315 | B2 | 6/2008 | Friar |
| 7,409,045 | B2 | 8/2008 | Naidoo et al. |
| 7,411,490 | B2 | 8/2008 | Perkinson et al. |
| 2002/0005894 | A1 | 1/2002 | Foodman et al. |
| 2002/0008886 | A1 | 1/2002 | Dausmann et al. |
| 2002/0024424 | A1 | 2/2002 | Burns et al. |
| 2002/0027504 | A1 | 3/2002 | Davis et al. |
| 2002/0040964 | A1 | 4/2002 | Dausmann et al. |
| 2002/0135491 | A1 | 9/2002 | Maier, Jr. |
| 2003/0005326 | A1 | 1/2003 | Flemming |
| 2003/0016130 | A1 | 1/2003 | Joao |
| 2003/0025599 | A1 | 2/2003 | Monroe |
| 2003/0067541 | A1 | 4/2003 | Joao |
| 2003/0072634 | A1 | 4/2003 | Powell |
| 2003/0080865 | A1 | 5/2003 | Capowski et al. |
| 2003/0104822 | A1 | 6/2003 | Bentley |
| 2003/0120367 | A1 | 6/2003 | Chang et al. |
| 2003/0193404 | A1 | 10/2003 | Joao |
| 2003/0206102 | A1 | 11/2003 | Joao |
| 2004/0024851 | A1 | 2/2004 | Naidoo et al. |
| 2004/0032491 | A1 | 2/2004 | Woody et al. |
| 2004/0036573 | A1 | 2/2004 | Fitzgibbon et al. |
| 2004/0036596 | A1 | 2/2004 | Heffner et al. |
| 2004/0041694 | A1 | 3/2004 | Xie |
| 2004/0041910 | A1 | 3/2004 | Naidoo et al. |
| 2004/0080401 | A1 | 4/2004 | Stewart et al. |
| 2004/0081322 | A1 | 4/2004 | Schliep et al. |
| 2004/0086088 | A1 | 5/2004 | Naidoo et al. |
| 2004/0086089 | A1 | 5/2004 | Naidoo et al. |
| 2004/0086090 | A1 | 5/2004 | Naidoo et al. |
| 2004/0086091 | A1 | 5/2004 | Naidoo et al. |
| 2004/0086093 | A1 | 5/2004 | Schranz |
| 2004/0088345 | A1 | 5/2004 | Zellner et al. |
| 2004/0104811 | A1 | 6/2004 | Stewart et al. |
| 2004/0135885 | A1 | 7/2004 | Hage |
| 2004/0145468 | A1 | 7/2004 | La et al. |
| 2004/0155770 | A1 | 8/2004 | Nelson et al. |
| 2004/0160319 | A1 | 8/2004 | Joao |
| 2004/0189460 | A1 | 9/2004 | Heaton et al. |
| 2004/0201584 | A1 | 10/2004 | Lee |
| 2004/0204915 | A1 | 10/2004 | Steinthal et al. |
| 2004/0212497 | A1 | 10/2004 | Stilp |
| 2004/0212498 | A1 | 10/2004 | Stilp |
| 2004/0217847 | A1 | 11/2004 | Fries et al. |
| 2005/0041734 | A1 | 2/2005 | Walker et al. |
| 2005/0052285 | A1 | 3/2005 | Iriyama |
| 2005/0068175 | A1 | 3/2005 | Faulkner et al. |
| 2005/0073411 | A1 | 4/2005 | Butler |
| 2005/0078672 | A1 | 4/2005 | Caliskan et al. |
| 2005/0110632 | A1 | 5/2005 | Berezowski et al. |
| 2005/0110637 | A1 | 5/2005 | Rao |
| 2005/0128067 | A1 | 6/2005 | Zakrewski |
| 2005/0134450 | A1 | 6/2005 | Kovach |
| 2005/0174229 | A1 | 8/2005 | Feldkamp et al. |
| 2005/0219048 | A1 | 10/2005 | Kimmel et al. |
| 2005/0225634 | A1 | 10/2005 | Brunetti et al. |
| 2005/0242945 | A1 | 11/2005 | Perkinson .................... 340/531 |
| 2005/0248444 | A1 | 11/2005 | Joao |
| 2005/0273831 | A1 | 12/2005 | Slomovich et al. |
| 2005/0275509 | A1 | 12/2005 | Flick |
| 2006/0012478 | A1 | 1/2006 | Carmichel |
| 2006/0017556 | A1 | 1/2006 | Stewart et al. |
| 2006/0017558 | A1 | 1/2006 | Albert et al. |
| 2006/0017559 | A1 | 1/2006 | Albert |
| 2006/0017561 | A1 | 1/2006 | Albert |
| 2006/0017579 | A1 | 1/2006 | Albert et al. |
| 2006/0022816 | A1 | 2/2006 | Yukawa |
| 2006/0025938 | A1 | 2/2006 | Cottrell |
| 2006/0028334 | A1 | 2/2006 | Adonailo et al. |
| 2006/0049934 | A1 | 3/2006 | Breen |
| 2006/0056386 | A1 | 3/2006 | Stogel |
| 2006/0072737 | A1 | 4/2006 | Paden et al. |
| 2006/0087421 | A1 | 4/2006 | Stewart et al. |
| 2006/0104312 | A1 | 5/2006 | Friar |
| 2006/0107298 | A1 | 5/2006 | Friar |
| 2006/0132301 | A1 | 6/2006 | Stilp |
| 2006/0132302 | A1 | 6/2006 | Stilp |
| 2006/0132303 | A1 | 6/2006 | Stilp |
| 2006/0176167 | A1 | 8/2006 | Dohrmann |
| 2006/0181406 | A1 | 8/2006 | Petite et al. |
| 2006/0192666 | A1 | 8/2006 | Parker et al. |
| 2006/0192668 | A1 | 8/2006 | Friar |
| 2006/0192669 | A1 | 8/2006 | Allen |
| 2007/0008125 | A1 | 1/2007 | Smith |
| 2007/0146127 | A1 | 6/2007 | Stilp et al. |
| 2007/0290842 | A1 | 12/2007 | Barone |
| 2008/0001734 | A1 | 1/2008 | Stilp et al. |
| 2008/0036593 | A1 | 2/2008 | Rose-Pehrsson et al. |
| 2008/0043987 | A1 | 2/2008 | Waalkes et al. |
| 2008/0048861 | A1 | 2/2008 | Naidoo et al. |
| 2009/0058630 | A1 | 3/2009 | Friar et al. |

FOREIGN PATENT DOCUMENTS

| | | |
|---|---|---|
| WO | WO 8700711 | 1/1987 |
| WO | WO 9310621 | 5/1993 |
| WO | WO 9422118 | 9/1994 |
| WO | WO 0075900 | 12/2000 |
| WO | WO 0199075 | 12/2001 |
| WO | WO 02061706 | 8/2002 |
| WO | WO 03065730 | 8/2003 |
| WO | WO2004012163 | 2/2004 |
| WO | WO2006012460 | 2/2006 |

* cited by examiner

SYSTEM AND METHOD FOR MONITORING SECURITY AT A PREMISES USING LINE CARD WITH SECONDARY COMMUNICATIONS CHANNEL

RELATED APPLICATION

This application is based upon prior filed provisional application Ser. No. 60/969,990 filed Sep. 5, 2007.

FIELD OF THE INVENTION

This invention relates to alarm systems, and more particularly, this invention relates to alarm systems in which alarm signals as alarm report data are forwarded from an alarm panel at a premises to a central station.

BACKGROUND OF THE INVENTION

Commonly assigned U.S. Pat. No. 7,391,315, the disclosure which is hereby incorporated by reference in its entirety, discloses a security system that uses various audio sensors as audio microphones located at one or more premises. In one non-limiting embodiment set forth in the '315 patent, the audio sensors receive audio signals and convert the audio signals to digitized audio signals. An audio sensor can receive audio signals and converts the audio signals to digitized audio signals, which can be processed at a central processor. In some aspects, the remote security or fire alarm systems can generate "reports" and transmit the reports to a central station alarm receiver.

The central station alarm receiver (hereinafter identified as an "alarm receiver"), accepts incoming calls or connections with "reports" from remote security or fire-alarm systems, through a variety of communication paths. The most common communications paths are PSTN dial-up circuits, point-to-point radio circuits and/or the internet. The "reports" generated by conventional security or fire alarm systems include alarm messages, equipment status messages, and periodic communications-check messages.

For connections over PSTN dial-up and point-to-point radio circuits, some models of alarm receivers use plug-in circuit boards called "line cards", or "channel-cards", to allow flexibility in the number and/or type of communication circuits supported by the alarm receiver. In general, line cards have an interface to the alarm receiver main processor system, and implement one or more modem circuits than can communicate with the remote security or fire-alarm systems. For each modem, the line card typically also has a physical interface connector for the corresponding communications circuit.

In the United States, central station facilities generally only use alarm receiver systems that are listed under UL (Underwriters Laboratories) standard 1610: "Central Station Burglar-Alarm Units," the disclosure which is hereby incorporated by reference in its entirety. If the central station operates as a UL-listed facility, it is mandatory to use alarm receivers listed under this UL standard.

The UL-1610 standard requires that an alarm receiver be able to operate independently of any central station "automation software." The most practical way to meet this requirement is for the alarm receiver to process internally any and all reports it receives from remote security or fire alarm systems, regardless of the communications path (PSTN dial-up, point-to-point radio, internet) through which the report was received.

In addition to validating the received report, and generating any automatic message-receipt acknowledgement required by the remote system, the alarm receiver must be capable of independently performing these actions:

a) presenting the report information (including the unique account-number information identifying the reporting system) on a display device built into the alarm receiver;

b) generating an audible and/or visible annunciation of new reports;

c) logging the report information in a non-volatile memory system, for later review or further processing;

d) providing some mechanism for a human operator to acknowledge physically receipt of the report; and e) directing a copy of each report to a printing device, which may be a part of the alarm receiver or electronically connected to the alarm receiver.

It should be understood that the UL standard allows operator-managed acknowledgement to be performed at an operator console that is part of the central station automation system, which is a software-based system. However, the alarm receiver must be capable of reverting to local (front-panel) operator-managed acknowledgement if the automation system becomes unavailable.

After the alarm receiver has accomplished these processing functions, it can optionally forward the alarm report data to any "automation software" that is in use at the central station.

In practice (particularly where several alarm receivers are installed in a central station facility), operators don't normally interface directly with alarm receivers. Instead, they handle received alarm reports on computer workstations that are part of the automation system. However, alarm receiver conformance to the UL 1610 standard ensures that the central station can respond to alarms if the automation system becomes unavailable.

In this UL-specified framework for communications between alarm receivers and conventional remote security or fire alarm systems, there are some important common characteristics of PSTN dial-up and/or point-to-point radio connections between the remote system and the central station:

a) except for a few special cases, the data-flow is unidirectional . . . from the remote system at the premises to the alarm receiver in the central station;

b) each connection is maintained only long enough for the remote system to transmit the report and receive any automatic message-acknowledgement from the alarm receiver; and c) report data (alarm messages, remote system status messages, periodic communication-check messages) are always processed internally by the alarm receiver, before the report information is forwarded to any central station "automation software."

These special cases are unique features in the remote system that can be controlled from the central station. To allow the bi-directional communications necessary for these remote system features, matching non-standard communications protocols and processes should be implemented on both the remote (premises) system and the alarm receiver. For the alarm receiver to retain its necessary UL listing, these non-standard protocols and processes must be compliant with the UL 1610 standard.

SUMMARY OF THE INVENTION

A security system includes at least one audio sensor and an alarm panel that transmits alarm report data through a communications network to at least one alarm receiver located at a central station remote from the premises that receives the alarm report data transmitted from the alarm panel through the communications network. A line card receives the alarm report data. An alarm receiver processor receives and processes regulated alarm report data in accordance with Underwriter Laboratories 1610 requirements. The line card is operable for receiving non-regulated alarm report data that is not regulated in accordance with Underwriter Laboratories 1610 requirements. The line card includes a secondary communications channel interfaced to a central station automation system and routes the regulated alarm report data to the central station automation system over the secondary communications channel and bypasses the alarm receiver processor.

The secondary communications channel is formed as a single Ethernet connection with the central station automation system in one non-limiting aspect. In another aspect, a non-regulated alarm report data comprises at least one of digitized audio and control messages. The regulated alarm report data is formed of at least one of account data from the premises, audible or visible enunciation of an alarm report and acknowledgements.

In yet another aspect, the alarm report data is formed as audio data collected at the at least one audio sensor and transmitted from the alarm panel. The alarm panel is operative for digitally encoding alarm report data and transmitting the digitally encoded alarm report data across the communications network. A modem processor can forward the digitally encoded alarm report data to the central station automation system.

In yet another aspect, the line card includes a modem processor for receiving alarm report data from legacy alarm panels at analog communication signals using Frequency Shift Keying (FSK) signaling. The analog communication signals are digitized as digitally encoded data and forwarded to the central station automation system. A terminator circuit has a plurality of analog front end devices and communications interface devices for interfacing with the communications network comprising a Public Switch Telephone Network (PSTN).

In yet another aspect, the line card establishes a bi-directional link for the non-regulated alarm report data between the central station automation system and the alarm panel without using the alarm receiver processor until the bi-directional link is no longer required. This link can be formed as audio data transmitted back and forth between the central station and the premises. The bi-directional link can be terminated when a central station operator determines that the bi-directional link is no longer required.

In yet another aspect, a central station alarm receiver that includes a receiver back plane that receives the line card and method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
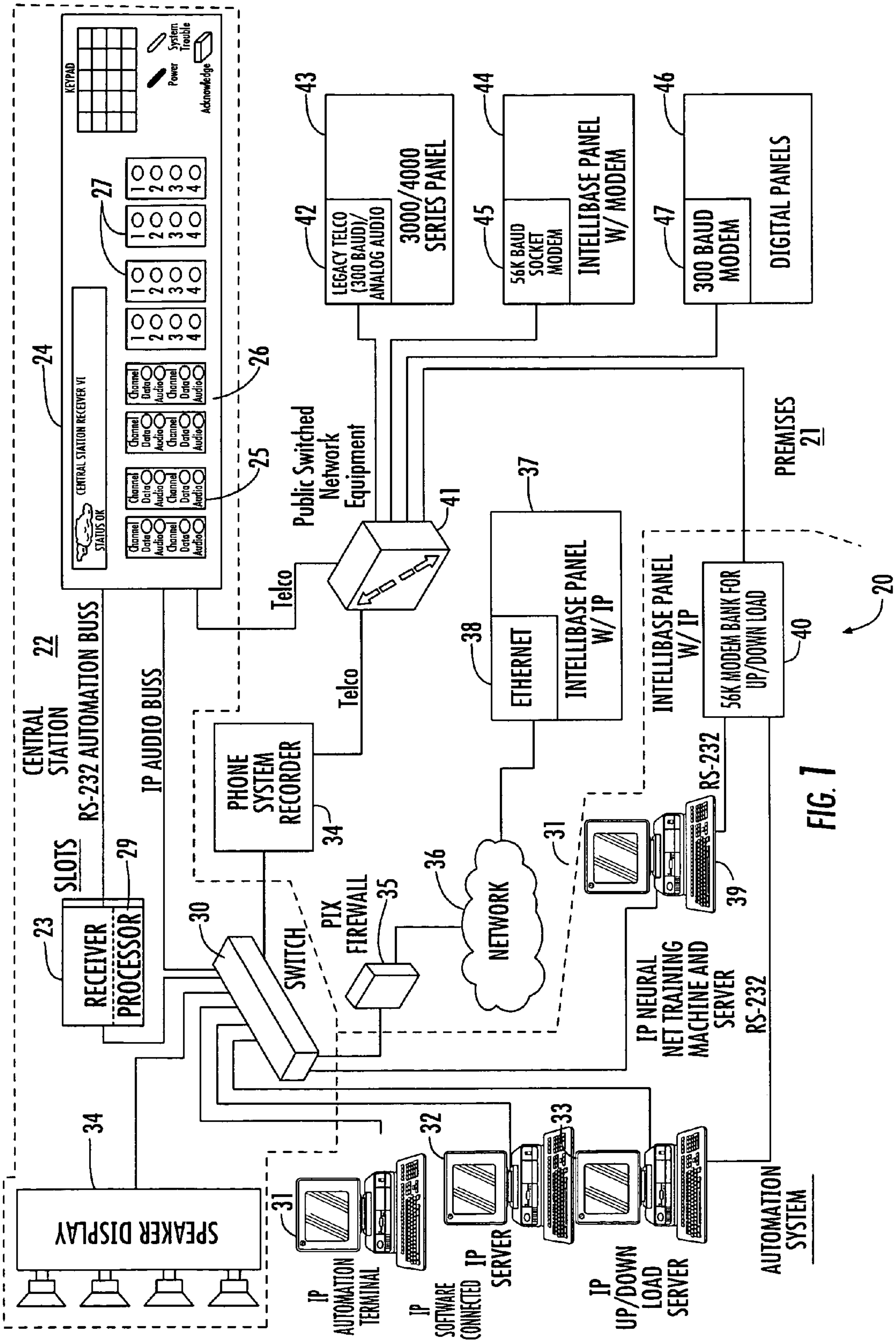
FIG. 1 is block diagram showing a security system with basic components that can incorporate the line card in accordance with non-limiting examples.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Central station alarm receivers can now include a line card that solves the technical problems described above. In accordance with a non-limiting example, a computational subsystem is implemented on the line card to analyze communications from the remote calling system. This subsystem detects any report information that is "regulated," and directs the corresponding report data to the alarm receiver for processing. In one aspect, the report data within the "regulated" communications is directed to a backplane connector on the line card, where it is available to the main-processor of an alarm receiver. In this case, the alarm receiver processes the report information in the same manner as it would for any conventional remote security or fire-alarm system.

When the computational subsystem detects report information from the remote system that is "non-regulated", the resulting information is directed through an alternate path to central station automation software. The alternate path bypasses the alarm receiver main processor.

Upon receiving the "non-regulated" information, the central station automation software can establish a bi-directional link to the remote system through the line card modem system and communications-circuit interface. The central station automation software system can maintain this bi-directional link until an operator or some automatic process determines it no longer needs to be maintained.

The computational subsystem can be implemented on a separate processor device on the line card, or can be implemented in software on a processor that performs any or all of the other line card tasks.

In yet another aspect, a secondary communications channel is physically implemented on the line card to provide a path for "non-regulated" communications to be routed exclusively to the central station automation software system, and not to the main processor of the alarm receiver.

In one aspect, the line card includes a secondary communications channel that is implemented as a single Ethernet connection on the back panel of the line card and supports "non-regulated" communications simultaneously for a plurality of PSTN dial-up connections implemented on the line card (four in a non-limiting example).

When the computational subsystem and secondary communications channel are applied to the line card, they can be supported with minor changes in the alarm receiver software and operation. These alarm receiver changes can be implemented in a manner that does not impair the alarm receiver's ability to meet the requirements of the UL-1610 standard. After the alarm receiver changes have been applied and the alarm receiver has been retested by UL for conformance to the UL-1610 standard, later changes to the line card design or firmware do not necessitate any further tests of the alarm receiver.

Thus, according to one aspect, a network interface, such as an Ethernet interface, is implemented on the line card to communicate non-alarm panel signalling such as digitized audio and control messages to the central station automation software. In yet another aspect, the line card "operating system" is implemented to control the routing of alarm-message signals to the receiver system and route non-alarm alarm-panel signalling such as the digitized audio and control messages to the central station automation-software through the line card network interface.

FIG. 1 shows a block diagram of an alarm system 20 that can be modified to use a line card in accordance with non-limiting examples and explained in further detail below, and showing part of the premises 21 and central station 23 that includes various servers and an alarm receiver 23 such as a Bosch/Lantronics receiver box connected with an RS-232 automation bus to a central station receiver 24 that includes several line cards such as modem line card 25, legacy line cards 26 and other line cards 27. These line cards could include the line card as described below with regard to FIGS. 3A, 3B and 4. The switch 30 can be a core component and connected to various servers and terminals, such as an IP automation terminal 31, IP server 32 and IP up/down load server 33 and a speaker/display 34. The switch 30 is also connected to the alarm receiver 23 and through the IP audio bus to the central station receiver 24 as illustrated. The switch 30 is also connected to the phone system recorder 34 that could be located at the premises or central station. The switch 30 is also connected to a firewall 35 that is connected to the communications network, which could be different types of communications network. The switch 30 can be an integral part of the receiver 23,24. The network 36 is connected to the intellibase panel 37 with IP capability through the communications connections, which in this instance is an Ethernet connection 38. The switch 30 is also connected to a neural net training machine and server 39 that works with the Internet Protocol, which in turn is connected to a 56K modem bank 40 for up/downloading. The central station receiver is connected through a telephone communications line to a public switched telephone network equipment 41, which in turn, could be connected to different panels such as through a legacy telephone communications interface connection 42 in a 3000/4000 series panel 42 for analog audio and an intellibase panel 44 with a 56K baud socket modem 45 and digital panels 46 with a 300 baud modem 47 in one non-limiting example.

Figure 2A:
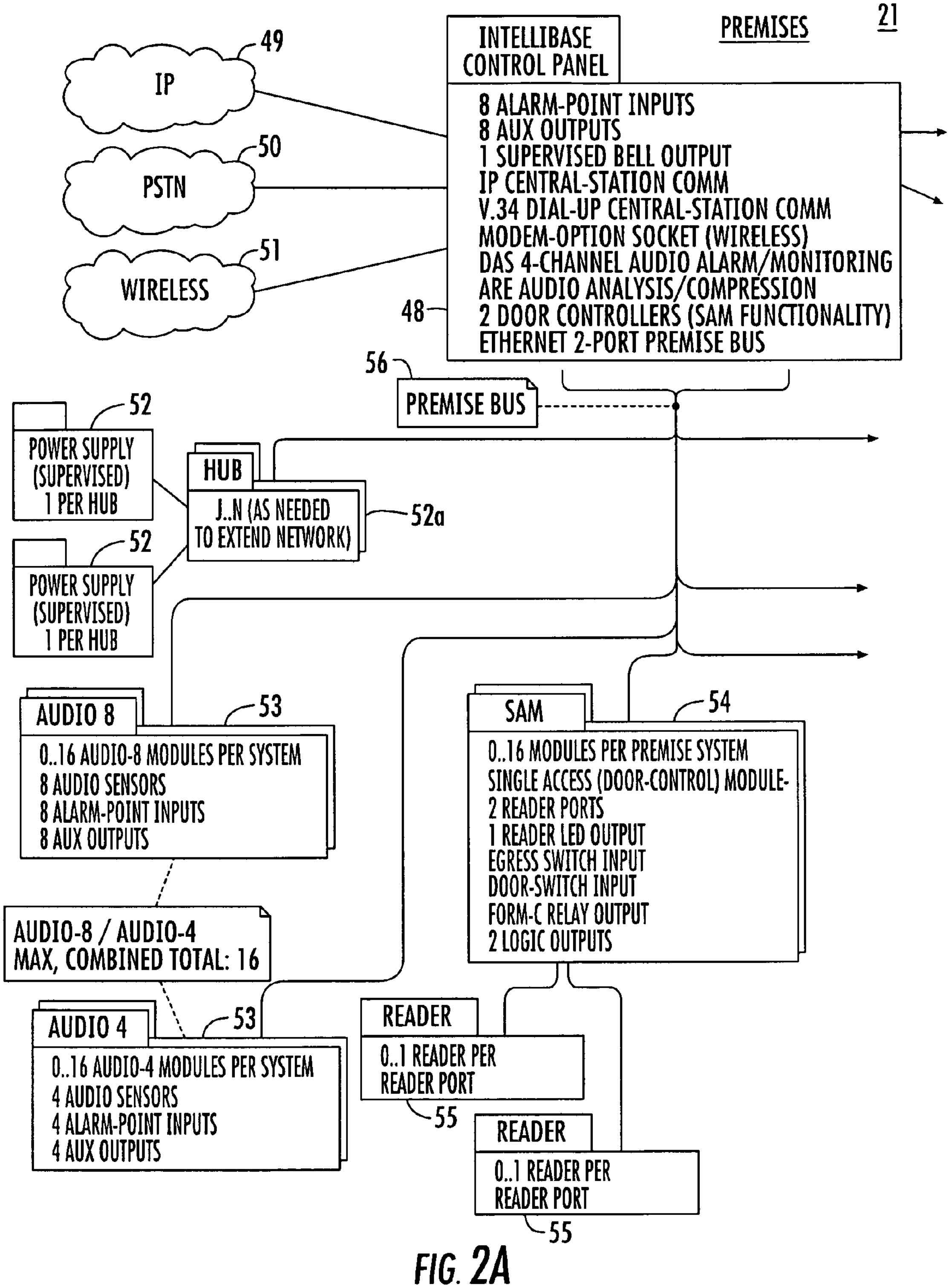
FIGS. 2A and 2B are block diagrams showing basic components of the security system that can be located at a premises in accordance with a non-limiting example.
Figure 2B:
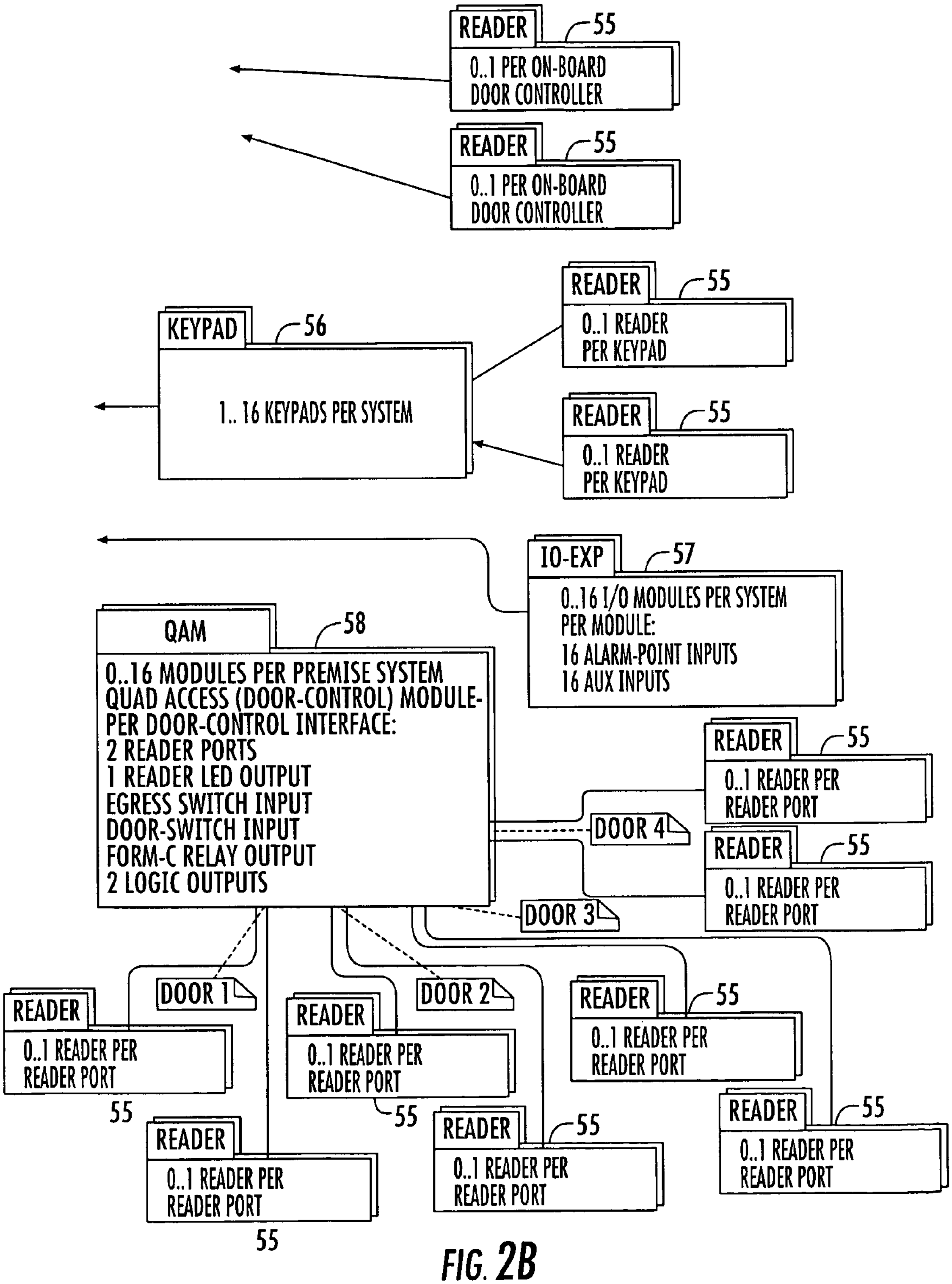

FIGS. 2A and 2B show basic components of an alarm system that could be located at a premises 21, including an intellibase control panel 48 that can connect to an IP network 49 such as the internet, a public switched telephone network (PSTN) 50 and a wireless network 51. The intellibase control panel 48 can include various inputs and outputs and other functions as indicated and connect to various power supplies 52 and hubs 52*a*, audio modules 53, single access (door-control) modules (SAM's) 54 and readers 55 as part of a premise bus 56. The control panel 48 also can connect through a bus to a keypad 56 and input/output expansion modules 57 and quad access (door-control) modules (QAM) 58 as indicated. As will be explained below, different features can be included on the control panel 48 and various circuit boards, including a line card.

The premises portion of the alarm system could include the intellibase control panel 48, including its various inputs that are connected to different hubs and different digital audio sensors (DAS). A DSP or other processor could be located on a control panel and act as a neural network analyzer. The digital audio sensor can operate as an audio conversion system. An equivalent digital audio sensor could be used for hardware and software built into a control panel. The digital audio sensor could have four or eight or more microphones or subsystems. The system could include an acoustic (audio) recognition engine (ARE). It should be understood that different microphones can be enabled and disabled through a control mechanism in the control panel. Five-second sound clips can be sent independently to the acoustic recognition engine. The signals from microphones are candidates for recognition by the acoustic recognition engine. For each microphone, a set of coefficients can be determined, corresponding to the rate-of-rise or average amplitude coefficients. Each digital audio sensor could send captured sound clips as packets over the Ethernet. These messages could arrive at the acoustic recognition engine. A digital signal processor at each digital audio sensor could determine if the sound clips should be analyzed. This could be similar to an event trigger. The content can be analyzed to determine if further analysis is required. There is some correlation of parameters, for example, determining the difference between a gunshot and thunder.

The five-second sound clips are evaluated by a digital signal processor or other processor on each digital audio sensor to determine if they are eligible for further analysis. The microphones can be identified by the input that they are connected to at each digital audio sensor module and have a unique address in the system to be enabled and disabled. Once the system determines that the event qualifies as an alarm, the five-second clip can be forwarded to the central station either through an IP connection or through a modem connection. High quality MPEG4 compression can be used.

The acoustic recognition engine and the neural network analysis can determine if threshold conditions are met for further analysis and the information and data from microphones can be mixed digitally to provide an aggregate signal to a central station monitoring system. One stream of data can extend from an alarm panel to the central station as a digital stream and compressed. Mixed audio can be digitally mixed at each digital audio sensor. The digital streams can be digitally mixed at each stage where a digital audio sensor is located on the network. Digital streams can be combined at each stage. It is a linear system in one aspect. The data can arrive as an aggregate mix at the alarm panel at which the acoustic recognition engine circuit is located.

In one aspect, the line card is formed as part of a receiver line card subsystem, for example, a Bosch receiver as described above. The card can be placed into a receiver back plane. The receiver can store different alarm reports and include an IP connection and Ethernet interface. The receiver can be part of a monitoring station and include a display, printer and control panel operated by an individual. There could be a serial-to-Ethernet converter to allow the connection of the receiver to the central station. The receiver can forward the alarm message to the central station as part of an automated system.

The line card can process the Ethernet message. The acoustic recognition engine can be in a control panel illustrated as an intellibase control panel. Different coefficients can be used as part of an analysis system that analyzes the audio clips before compression and extract coefficients used in the processing. A coefficient development system can be implemented such that coefficients can be analyzed at different sites and nuisance sounds removed. Parameterization can be accomplished to determine if different sound parameters justify further analysis of alarms. The algorithm can look at the characteristics of the sound parameters. Sounds can be run through a training system to create a training set. There could be artificial intelligence learning in the system used with training sets.

Figure 3A:
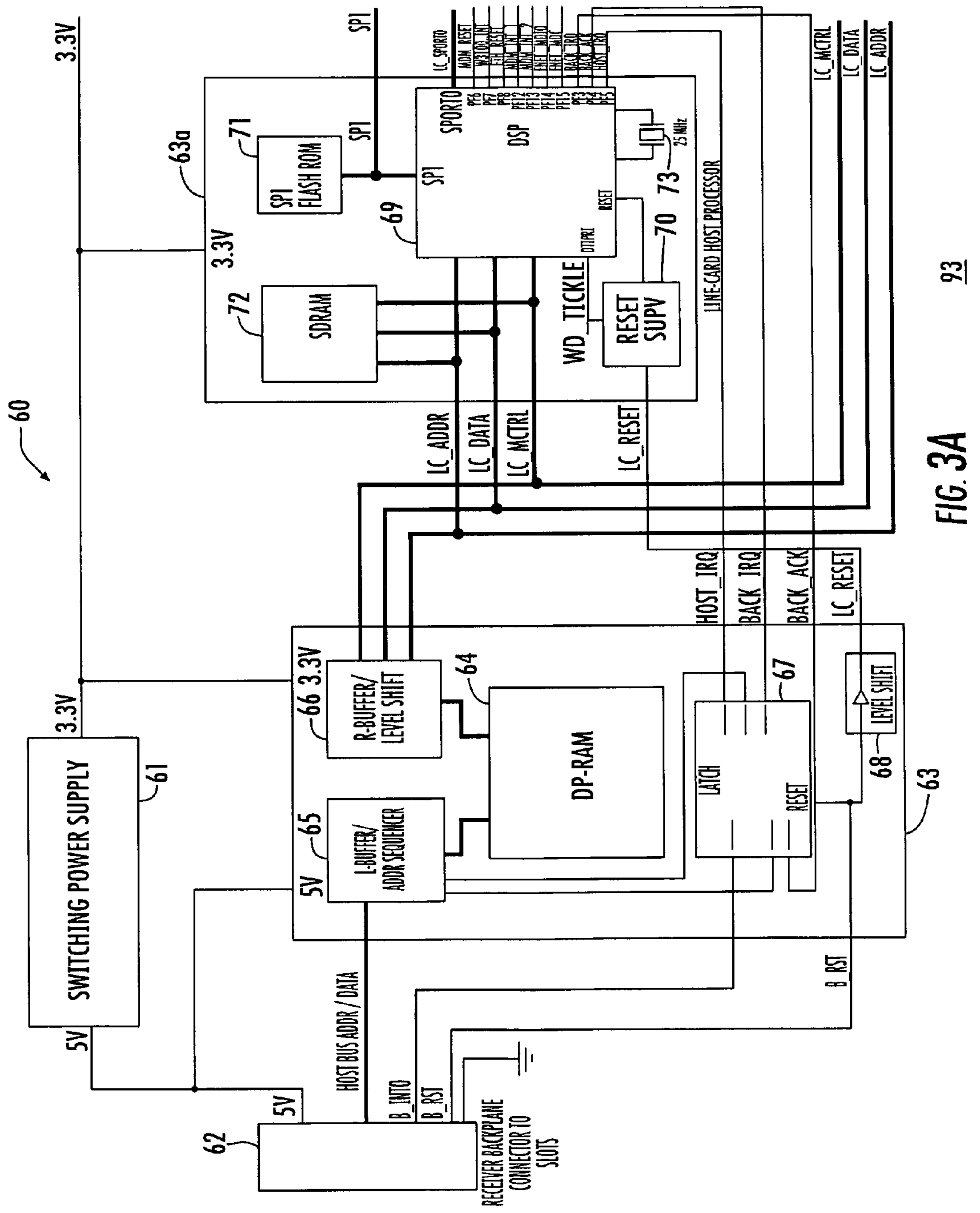
FIGS. 3A and 3B show basic components of a line card for the security system in accordance with a non-limiting example.
Figure 3B:
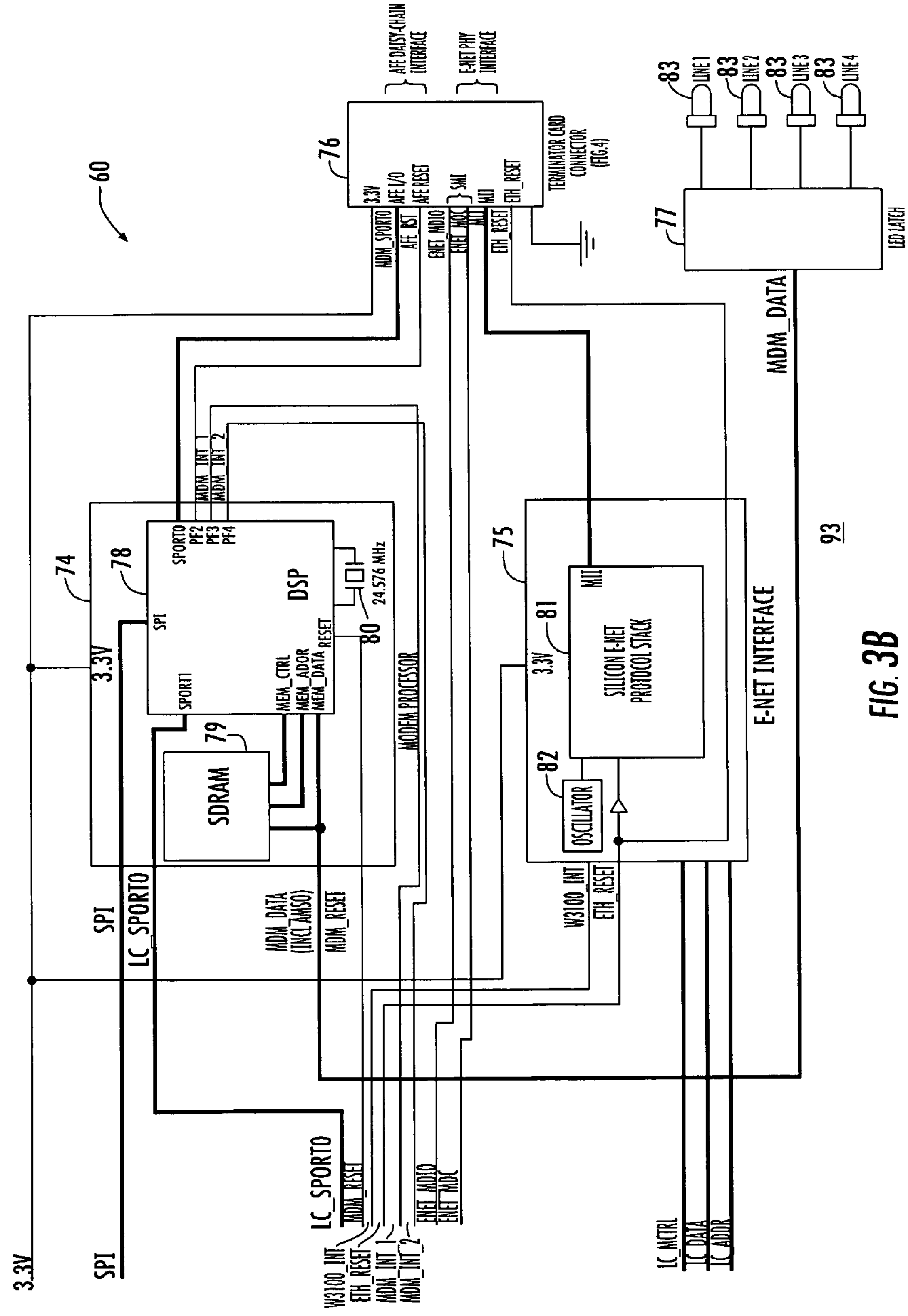

FIGS. 3A and 3B show a line card circuit 60 in accordance with a non-limiting example that can be included on one circuit board and received within a central station alarm receiver. On FIG. 3A, basic components are illustrated including a switching power supply 61, the receiver host-bus or backplane connector 62, host-bus interface circuitry 63 and line card host processor 64. The host-bus interface circuit 63 includes a SRAM dual-port circuit (DP-RAM) 64 such as a CY7C135-55 circuit that is operative with an L-buffer/address sequencer 65 and R-buffer/level shift 66 as part of left and right ports. The L-buffer/address sequencer 65 is operative with a semaphore latch 67 and level shift circuit 68.

The line card host processor 64 includes a digital signal processor 69 such as an Analog Devices Blackfin BF-532 DSP that is operative with a reset supervisor circuit 70, a 2 (two) megabyte SPI flash ROM 71 in one non-limiting example, a 128 megabyte SDRAM 72, and crystal oscillator (25 MHz) 73. The components are interconnected as illustrated with the various communication circuits and interrupt lines, address lines and other bus lines.

FIG. 3B shows the continuation of the line card processor circuit 60 including a modem processor 74 and E-net interface circuit 75 as an Ethernet processor, a terminator card connector 76 and LED latch 77 for status LED's as illustrated. The modem processor 74 could include an Analog Device Blackfin BF-532 DSP 78 that is operable with a 128 megabyte SDRAM 79 similar to what is shown in FIG. 3A with the line card host processor 64 and crystal oscillator 80. The E-net interface circuit 75 includes a WIZNET W3100A silicon E-net protocol stack 81 that is operable with an oscillator 82, such as a 25 MHz oscillator. The LED latch 77 connects to different LED's 83. The different bus connectors and communications interface circuits are illustrated.

Figure 4:
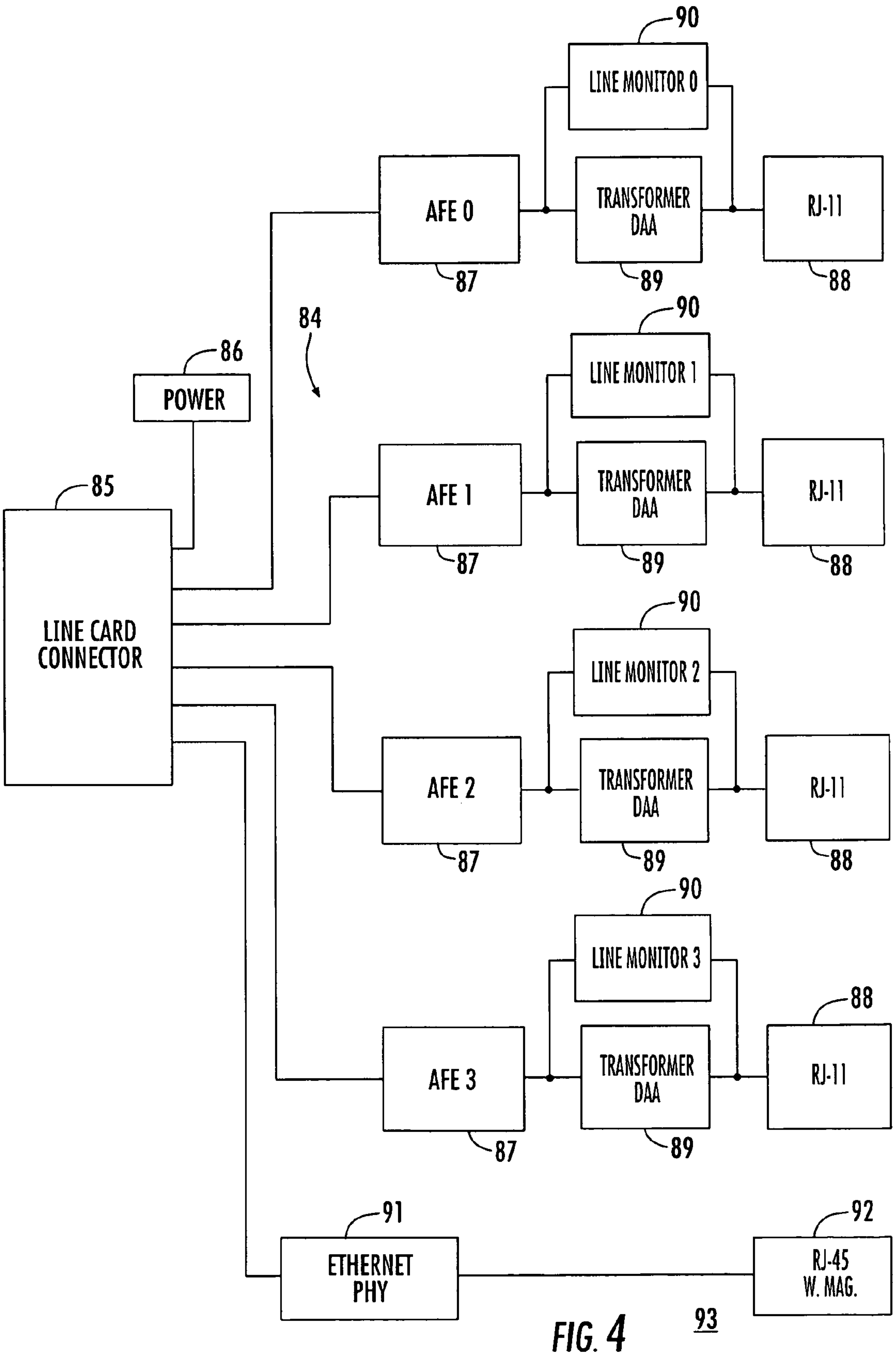
FIG. 4 shows basic components of a terminator circuit for the security system that can be used with the line card of FIGS. 3A and 3B in accordance with a non-limiting example.

FIG. 4 illustrates basic components that could be included on a terminator circuit board 84 that includes a line card connector 85, power supply 86 and four analog front-end (AFE) devices 87 that are interfaced to separate RJ-11 telephone company jacks 88 through a transformer direct access arrangement (DAA) circuit 89 and line-monitoring circuits 90. The circuit board includes an Ethernet PHY 91 device and RJ45 jack 92 with embedded magnetics, which implements a direct Ethernet communications path between each line card pair and a central station automation system such as shown in FIG. 1, including possibly the use of the terminals that include the IP automation terminal 31, IP server 32, IP up/down load server 33 and IP neural net training machine and server 39 as non-limiting examples.

The line card system includes line terminator circuit board 84 and line card processor circuit board 60, together forming the line card system. These boards could be installed as an inter-connected pair in any of the line card "slots" of a central station alarm receiver such as Bosch D6600 alarm receiver as a non-limiting example. In one non-limiting example, there are eight line card slots.

Each line card pair 60, 84 (hereafter referred to simply as "line card" for purposes of description and referred generically by the description numeral 193) can support up to four concurrent dial-up calls from either legacy alarm panels, or new "Intellibase" alarm panels such as shown and described in FIGS. 1, 2A and 2B. For either type of calling alarm panel, the line card 93 makes the basic alarm-report data available to the host processor 64 in the receiver through the receiver backplane. This basic alarm-report information is then processed by the receiver and forwarded to the central station automation system in the same manner as for dial-in alarm reports received from conventional alarm panels by conventional Bosch D6640 or D6641 line cards.

When reporting an alarm event, the alarm panels differ from "conventional" alarm panels in that they will typically also transmit audio signals from one or more microphones (the "audio sensors") located at the protected premise. Legacy alarm panels transmit this audio to the central station as an analog signal. The Intellibase panels transmit audio to the central station as a digitally encoded signal. The line card 93 makes the audio information from either legacy or Intellibase alarm panels 37 available to the "IP" central station automation system through an Ethernet port that in one aspect is an integral part of the line card.

While conventional alarm panels will typically hang-up the telephone connection immediately after successfully delivering an alarm report to a central station receiver, the telephone connection with the alarm panel, in accordance with a non-limiting aspect, will normally be maintained until a central station operator determines that it is no longer necessary to continue monitoring audio from the protected premise.

The modem subsystem such as the included modem processor 74 in the line card 93 receives alarm calls from legacy alarm panels using Bell-103 FSK signaling as a non-limiting example. When legacy alarm panels transmit analog audio to the central station, the modem digitizes the received audio, so that it can be communicated to the IP central station automation system through a line card 10BASE-T/100BASE-TX Ethernet port. In the case of calls from Intellibase alarm panels, such as 37 in FIG. 1, which communicate with V.34 modem technology, the digitally-encoded audio signal from the alarm panel is forwarded through the line card Ethernet port to the automation system.

Two Analog Devices Inc. "Blackfin" ADSP-BF532 DSP-controller devices as processors 69, 78 are used on the line card such as shown in FIGS. 3A and 3B. One of these devices functions with other components as the line card "host" processor 63*a* (FIG. 3A), and the other functions as the modem processor 74 (FIG. 3B) for different dial-up modem channels in this example, four channels. For all four lines, most modem signal and protocol functionality is implemented as DSP software. This includes V.34 negotiation (signaling-and-connection handshake) with Intellibase alarm panels, and the Bell-103 signaling, tone detection and audio digitization required for communication with legacy alarm panels. The modem system also supports advanced telephony features such as caller-ID decode, DTMF decode and encode, and cut-line detection.

The description proceeds relative to a Bosch alarm receiver system as described above in a non-limiting example. Eight line card slots can be included on the receiver backplane connector 62 and implemented as an electrical subset of the PC 8-bit ISA (Industry Standard Architecture) bus in a non-limiting example.

An example of the ISA-bus signals that can be bussed across the slot connectors are DATA 0-7, IO_ADDR 0-2, /IOR, /IOW, and RESET as non-limiting examples. A separate/SELECT signal can be provided to each line card slot connector. Each line card slot connector carries an individual interrupt-request request signal from the line card to a receiver CPU (processor). This subset of ISA signals allows the receiver CPU to communicate with the line card via ×86 byte IO instructions.

Other than power connections, none of the other ISA and proprietary signals that are provided on the line card slot connectors are used by the line card. Each slot connector would typically have three ground pins, and two pins for each of the +5V, +12V and −12V power-supply voltages in a non-limiting example.

The B_RST line card reset signal as shown in FIG. 3A at the connector 62 is generated by the receiver CPU, and is presented on pin 15 of every slot connector. When B_RST is asserted, it causes all of the installed line cards to be reset. On each line card, B_RST can be buffered.

A semaphore latch circuit 67 can be reset in the dual-port (DP) RAM 64. An asserted LC_RESET condition as shown from the level shift 68 and reset circuit 70 in FIG. 3A can be generated. LC_RESET is the reset control for all of the line card processor-controlled electronics. A level shift as from the level shift circuit 68 can be provided between the 5V logic of the receiver interface and the 3.3V logic of the host-processor system.

Communication between the receiver CPU and the line card is transferred through the dual-port (DP) RAM 64 and associated host-bus interface 63. The heart of this subsystem is a Cypress Semiconductor CY7C135-25 dual-port (DP) SRAM 64. This device has a 4K×8 static Random Access Memory (SRAM) array that can be independently accessed with two separate sets of address, data and control signals. The two different sets of interfaces are typically identified as the left and right 'ports' and includes the address sequencer 65 and level shift 66. This circuit does not include any arbitration circuitry and it is possible to perform simultaneously a "read" on one port while performing a "write" access to the same byte location on the other port. The results of such an operation are undefined. On the line card, arbitration for access to the dual-port memory subsystem is managed by the separate semaphore latch circuit 67.

The receiver CPU (processor) 29 accesses the dual-port SRAM through address-sequencer circuits 65 connected to left port address inputs. The line card host processor 64 accesses the dual-port SRAM 64 through a right port circuit including buffer 66 in a non-limiting example. Addressing is routed through buffers. Right port data is transferred into or out of the SRAM through any buffer circuit.

Any of the byte locations (4096 in this example) in the DP-SRAM 64 can be addressed by either the receiver or the line card host-processor circuit 63*a*. In a current receiver implementation, only the first 1024 locations of DP-SRAM are used.

The dual-port SRAM 64 does not include any internal arbitration logic. A "read" on one port at the same address where the other port is undergoing a "write" can result in incorrect data being read from the device. To prevent conflicts due to simultaneous DP-SRAM left and right access, semaphore latches have been implemented on the line card, a receiver-CPU DP-SRAM access latch, and a line card host-processor DP-SRAM access latch (only one is illustrated as 67).

The receiver backplane provides +5V and ±12V power-supply voltages at each slot connector. Because the interface at the slot connector operates at 5V logic levels, the Dual-Port RAM subsystem and companion semaphore-latch logic operate at 5V. All other components of the line card operate at 3.3V power-supply and logic levels. Voltage translation occurs in a buffer and transceiver devices.

With a 5V±10% supply voltage, the DP-SRAM circuit has the following logic-level specifications as a non-limiting example:

| | Min | Max |
|---|---|---|
| $V_{IH}$ | 2.2 V | |
| $V_{IL}$ | | 0.8 V |
| $V_{OH}$ | 2.4 V | |
| $V_{OL}$ | | 0.4 V |

A data-bus transceiver can operate from a line card 3.3V supply, and offers the same $V_{OH}$ and $V_{OL}$ characteristics as any buffer devices. For the receive direction (when the host-processor circuit 63*a* is reading data from the DP-SRAM 64), the minimum $V_{IH}$ is 2.0V, and the maximum $V_{IL}$ is 0.8.

With the host-processor 63*a* asynchronous-interface timing characteristics set to allow for reasonable settling times (primarily allowing for capacitive loading), this combination of buffer and transceiver devices provides adequate margins for the interface between the line card 5V and 3.3V logic systems.

A National Semiconductor LM2852Y-3.3 fixed-voltage switching regulator can provide 3.3V power used on the line card in a non-limiting example. This integrated device is laser-trimmed to operate at a chosen output voltage, and requires very few external components. The inductor and capacitor values can be chosen to operate optimally at 650 mA output current, with a nominal 5V input.

The line card host-processor including the DSP as 69 an Analog Devices Inc. Blackfin BF-532 controller in one non-limiting example. The core section of this device can operate at up to 300 MHz. The controller (DSP) 69 in one non-limiting example has 80K bytes of internal high-speed memory that can be configured as instruction or data cache and/or SRAM. The extensive set of on-board IO hardware supports external SDRAM, asynchronous memory and IO devices, serial devices and SPI devices. Almost all of these peripherals can be supported by the DMA capabilities of the controller. Other built in peripherals include two flexible timer systems, 16 general-purpose IO pins, and two high-speed serial communication ports.

The reset input of the host processor 69 is managed by a Texas Instruments TPS3820-33 Power-On Reset Controller 70 in one non-limiting example. This reset controller will assert its active-low reset output during power-on while the supply voltage is less than 2.93 volts. Also, after the reset output has been negated (allowing the processor to start operation) any time the supply voltage drops below the 2.93V threshold, the controller will re-assert the reset output.

The reset controller 70 (also termed reset supervisor circuit) can have a watchdog input. After the controller comes out of reset, an uninterrupted stream of pulses can be received on the watchdog input, or the controller will generate a momentary reset. A useful feature of the watchdog function is that it does not start operating until at least one pulse occurs on the watchdog input. This greatly simplifies debugging any watchdog keep-alive software.

The reset controller 70 also has a Master Reset input that can be used to force a reset when the supply voltage is above the 2.93V threshold and a valid watchdog keep-alive signal is present. On the line card, this active-low Master Reset input is driven by the LC_RESET signal. The LC_RESET signal is produced by a receiver backplane reset circuit and extend through the backplane connector 62.

A CM309-series 25 MHz crystal 73 controls the clock frequencies of the host-processor 63*a*. This crystal drives a software-configurable PLL in the processor 69, and the core clock and system-clock for any processor peripherals are generated with software-configurable dividers running off of a phase-locked loop (PLL) in a non-limiting example (not shown).

A ST M25P40 4 Mbit SPI-serial Flash ROM 71 is connected to the host DSP processor 69 through a SPI bus as illustrated. This flash ROM contains firmware for both the host processor 69 and the modem processor 74 that includes the DSP processor 78. The host DSP processor mediates the transfer of the modem processor firmware from this Flash ROM 71 to the modem processor 74.

The host DSP processor 69 can have different pins, which can be used for the following functions:

| | | |
|---|---|---|
| PF0 | NC | unused |
| PF1 | SPI_SLFLG | output - SPI interface to modem processor - Activity flag |
| PF2 | SPI_SL_CS | output - SPI Flash ROM - Chip Select, dedicated for Boot operation |
| PF3 | BACKIRQ | input - Q output of receiver-CPU DP_SRAM access latch |
| PF4 | BACKACK | output - clear receiver-CPU DP_SRAM access latch |
| PF5 | HOSTIRQ | output - set host processor DP-SRAM access latch |
| PF6 | MDM_RESET | output - reset control for modem processor |
| PF7 | W3100_INT | input - interrupt request from Wiznet W3100 protocol-stack processor |
| PF8 | ETH_RESET | output - reset control for line card Ethernet subsystem |
| PF9 | SPI_SSEL | output - SPI interface to modem processor select |
| PF10 | SER_DBG_4 | undefined - handshake line 1 for serial debug port |
| PF11 | SER_DBG_3 | undefined - handshake line 2 for serial debug port |
| PF12 | MDM_INT_1 | input - interrupt request 1 from modem processor |
| PF13 | MDM_INT_2 | input - interrupt request 2 from modem processor |
| PF14 | ENET_MDIO | IO - serial data for PHY SMI configuration interface |
| PF15 | ENET_MDC | output - clock for PHY SMI configuration interface |

The host DSP processor 69 communicates with the modem DSP processor 78 through the host DSP processor's SPORT0 high-speed serial communications interface as illustrated. The host DSP processor SPORT0 interface is connected to the modem DSP processor SPORT1 interface. Both the primary and secondary channels of these SPORT interfaces are interconnected.

The host DSP processor 69 boots from the SPI Flash ROM 71. A boot-loader program first loads a small "exe" file that contains the program to load the remainder of the host processor firmware from the Flash ROM. The host processor 63*a* operating firmware then transfers the operating firmware for the modem processor 74 from the Flash ROM with the modem processor in the processor "boot from SPI Host" mode. The modem DSP processor 71 is also an Analog Devices Inc. BF-532 controller, identical to the line card host DSP processor 69 in this non-limiting example. The core section of the modem DSP processor 78 can be powered by a switching regulator controller built into the processor.

A CM309-series 24.576 MHz crystal 73 as noted before controls the clock frequencies of the host processor 63*a*. This crystal drives a software-configurable PLL (not shown) in the processor, and the core clock and system-clock for the peripherals are generated with software-configurable dividers running off of a PLL. This crystal frequency has been chosen to allow operation of the modem processor 74 SPORT0 interface at the correct frequency for driving a AFE serial-bus daisy-chain.

Different pins (not all illustrated) on the modem processor 74 are used for the following functions in a non-limiting example:

| | | |
|---|---|---|
| PF0 | SPI_SSEL | input - SPI interface to host processor - Select |
| PF1 | SPI-SLFLG | input - SPI interface to host processor - Activity flag |
| PF2 | AFE-RST | Output - reset control for AFE daisy-chain |
| PF3 | MDM_INT_1 | Output - interrupt request 1 to host processor |
| PF4 | MDM_INT-2 | Output - interrupt request 2 to host processor |
| PF5 | NO_TERM | input - detection of the presence of a Terminator card |
| PF6 | NC | Unused |
| PF7 | NC | Unused |
| PF8 | NC | Unused |
| PF9 | NC | Unused |
| PF10 | SER_DBG_4 | undefined - handshake line 1 for serial debug Port |
| PF11 | SER_DBG_3 | undefined - handshake line 2 for serial debug Port |
| PF12 | NC | unused |
| PF13 | NC | unused |
| PF14 | NC | unused |
| PF15 | NC | unused |

The four AFE's 87 (FIG. 4) are connected to the modem processor 74 on the processor's SPORT0 high-speed serial data-bus. This data-bus is routed through the processor circuit board 60 to terminator circuit board 84 interconnect as the lien card connector 85. The AFE's 87 are connected to the single high-speed serial-bus through a TDMA daisy-chain arrangement in one non-limiting example. All clocks for operation of the AFE's are provided through this high-speed serial bus.

The firmware for the modem processor 74 can be stored in the SPI Flash ROM 71 connected to the host DSP processor 69. After the host DSP processor 69 has completed its boot process, and begins execution of the firmware, it moves an image of the modem processor firmware to the host processor SDRAM 72. The host DSP processor 69 then releases a modem processor reset, and loads the firmware into modem DSP processor 78 memory spaces. The host DSP processor 69 acts as the SPI master for a "slave boot operation."

In non-limiting examples, there are four identical telephone-line interface circuits that include the parallel AFE's 87 on the terminator circuit board 84 as shown in FIG. 4. These circuits connect to the central station phone system through the tip and ring terminals of the RJ-11 "telco" jacks 88. Coupling transformers 89 are used as illustrated.

On the terminator circuit board 84, each AFE 87 can be a separate Teridian 73M1903C AFE (Analog Front End) device, which performs digitization of audio signals on the secondary side of the coupling transformer as shown in FIG. 4.

The four AFE's 87 are connected to the modem processor 74 on the processor's SPORT0 high-speed serial data-bus. This data-bus is routed through the processor circuit board to a terminator circuit board interconnect 85. The AFE's are connected to the single high-speed serial-bus through a TDMA daisy-chain arrangement. All clocks for operation of the AFE's are provided through this high-speed serial bus.

In addition to its signal-conversion functions, each AFE 87 has eight general-purpose IO pins (not illustrated in detail). On the line card design, four of these lines on each AFE are used for these purposes:

| | |
|---|---|
| GPIO-0 | input - CHK_HOOK_x on-hook supervision signal from the CPC-5710N Phone Line Monitor IC |
| GPIO-1 | input - CHK_PSTN_x off-hook supervision signal from the CPC-5710N Phone Line Monitor IC |
| GPIO-2 | output - HOOK_x hook switch opto-coupler control |
| GPIO-3 | input - Ring_ x signal from ring-detector opto-coupler |

AFE analog transmit and receive signals are connected to the secondary side of a coupling transformer 89 through several RC networks (not shown). The purpose of these networks is to optimize the interface between the AFE and the connected telephone "loop" over the range of expected impedance conditions and signal levels, for the chosen coupling transformer. AN analog power-supply pin of each AFE 87 is decoupled from the digital supply with a ferrite bead.

The various Ethernet and internet networking protocols supported by the line card are implemented with a Wiznet W3100A "Silicon Protocol Stack" circuit 81. This device provides protocol functionality via a hardware implementation. The protocol stack circuit 81 is interfaced to the host-processor **63*a* through the processor's asynchronous memory system, using a host-processor AMSO synchronous-memory select as a non-limiting example. The clock for the protocol stack circuit is a 3.2×5 mm 25 MHz oscillator 82** in a non-limiting example.

The protocol stack circuit 81 communicates with an Ethernet PHY 91 on the terminator circuit board, through a standard MII interface. The MII signals are routed between the two circuit boards through a 48-pin interconnect.

A physical-layer 10BASE-T/100BASE-T Ethernet interface can implemented using a Teridian 78Q2123 PHY device 91 as a non-limiting example on the terminator circuit board of FIG. 4 in a non-limiting example. The Ethernet PHY 91 is managed by the protocol stack device through a MII interface. In addition to providing the physical layer Ethernet interface, this device controls the link-status LED's in the Ethernet jack. The clock for the PHY device is controlled by a 25 MHz CM309 crystal.

A RJ-45 jack 92 with integrated magnetics provides the physical connection to the network. This jack includes built-in link-status LED's (FIG. 4).

The four bi-color LED line-status indicators (FIG. 3B) can be controlled by outputs of a latch. The LED color can be selected by setting the polarity of the four pairs of latch outputs. Latch outputs can be set by the modem-processor writing to any address within the range controlled by the processor's AMSO asynchronous-memory select output. The clock signal for the latch is produced by the combination of a modem-processor AMSO asynchronous-memory select and a modem-processor AWE asynchronous-memory select.

There now follows a description of security systems such as described in the incorporated by reference and commonly assigned U.S. Pat. No. 7,391,315. Those described circuits, components and modules can be modified to use the line card 93 as described relative to FIGS. 3A, 3B and 4.

Figure 5:
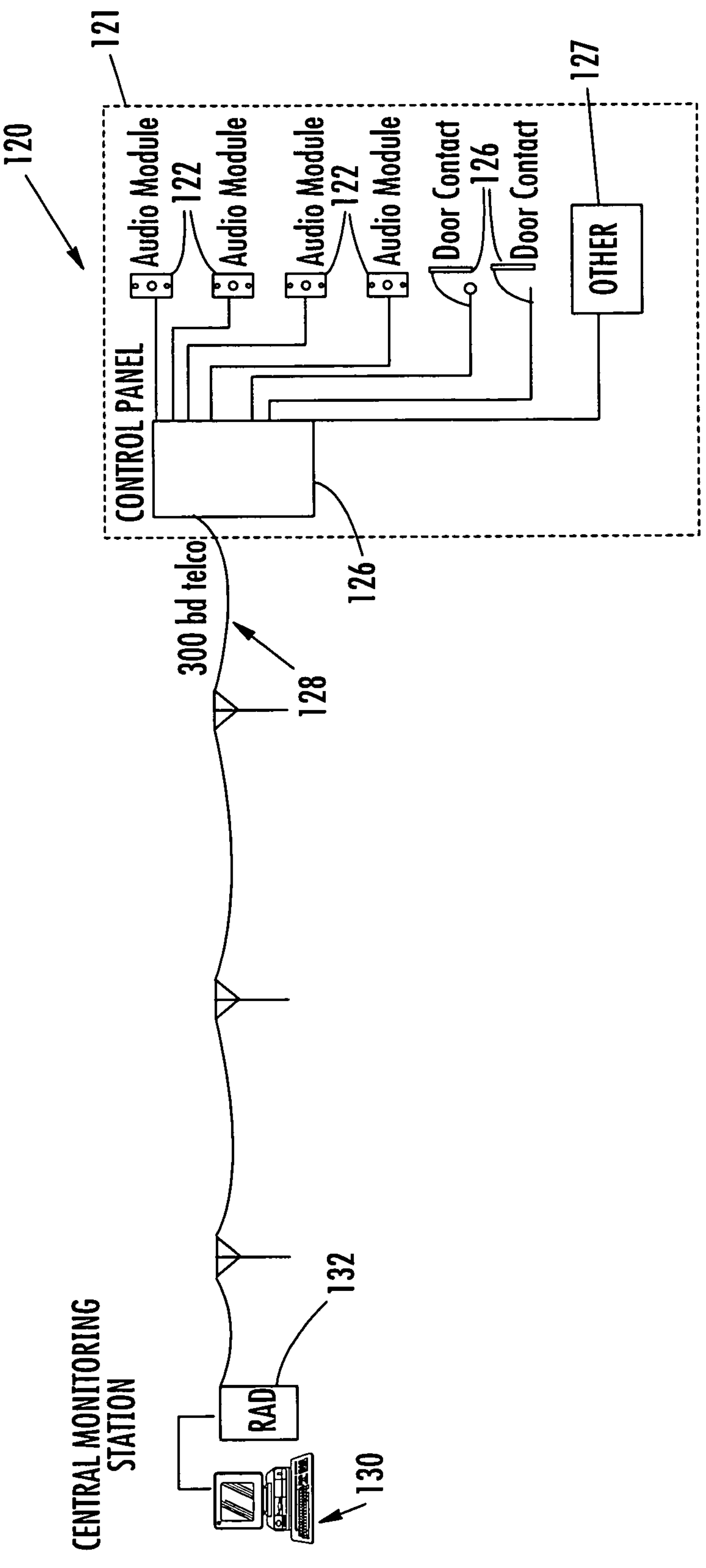
FIGS. 5-17 are block diagrams and a logic diagram (FIG. 15) showing non-limiting examples of the security system such as set forth in the incorporated by reference and commonly assigned U.S. Pat. No. 7,391,315, which can be modified for use in accordance with a non-limiting example.

FIG. 5 shows a security or alarm system 120 located in a customer premises 121 in which the audio sensors 122 are formed as analog audio modules having microphones and connect into an analog control panel 124. The audio modules 122 are operative as analog microphones and may include a small amplifier. Door contacts 126 can also be used and are wired to the control panel 124. Other devices 127 could include an ID card reader or similar devices wired to the control panel. This section of a customer premises 121, such as a factory, school, home or other premises, includes wiring that connects the analog audio modules 122 direct to the control panel 124 with any appropriate add-ons incorporated into the system. The phone system 128 as a Plain Ordinary Telephone System (POTS) is connected to the control panel 124, and telephone signals are transmitted over a 300 baud industry standard telephone connection as a POTS connection to a remotely located central monitoring station 130 through a Remote Access Device (RAD) 132. The central monitoring station typically includes a computer or other processor that requires Underwriter Laboratory (UL) approval. The different accounts that are directed to different premises or groups of alarm devices can be console specific.

In this type of security system 20, typical operation can occur when a sound crosses a threshold, for example, a volume, intensity or decibel (dB) level, causing the control panel 126 to indicate that there is an intrusion.

A short indicator signal, which could be a digital signal, is sent to the central monitoring station 130 from the control panel 126 to indicate the intrusion. The central monitoring station 130 switches to an audio mode and begins playing the audio heard at the premises 121 through the microphone at the audio sensors or modules 122 to an operator located at the central monitoring station 130. This operator listens for any sounds indicative of an emergency, crime, or other problem. In this system, the audio is sent at a 300 baud data rate over regular telephone lines as an analog signal.

In a more complex control panel 124 used in these types of systems, it is possible to add a storage device or other memory that will store about five seconds of audio around the audio event, which could be a trigger for an alarm. The control panel 124 could send a signal back to the central monitoring station 130 of about one-half second to about one second before the event and four seconds after the event. At that time, the security or alarm system 120 can begin streaming live audio from the audio sensors 122. This can be accomplished at the control panel 124 or elsewhere.

This security system 120 transmits analog audio signals from the microphone in the audio sensor or module 122 to the control panel 124. This analog audio is transmitted typically over the phone lines via a Plain Old Telephone Service (POTS) line 128 to the central monitoring station 130 having operators that monitor the audio. The central monitoring station 130 could include a number of "listening" stations as computers or other consoles located in one monitoring center. Any computers and consoles are typically Underwriter Laboratory (UL) listed, including any interface devices, for example phone interfaces. Control panels 124 and their lines are typically dedicated to specific computer consoles usually located at the central monitoring station 130. In this security system 120, if a particular computer console is busy, the control panel 124 typically has to wait before transmitting the audio. It is possible to include a digital recorder as a chip that is placed in the control panel 124 to record audio for database storage or other options.

Figure 6:
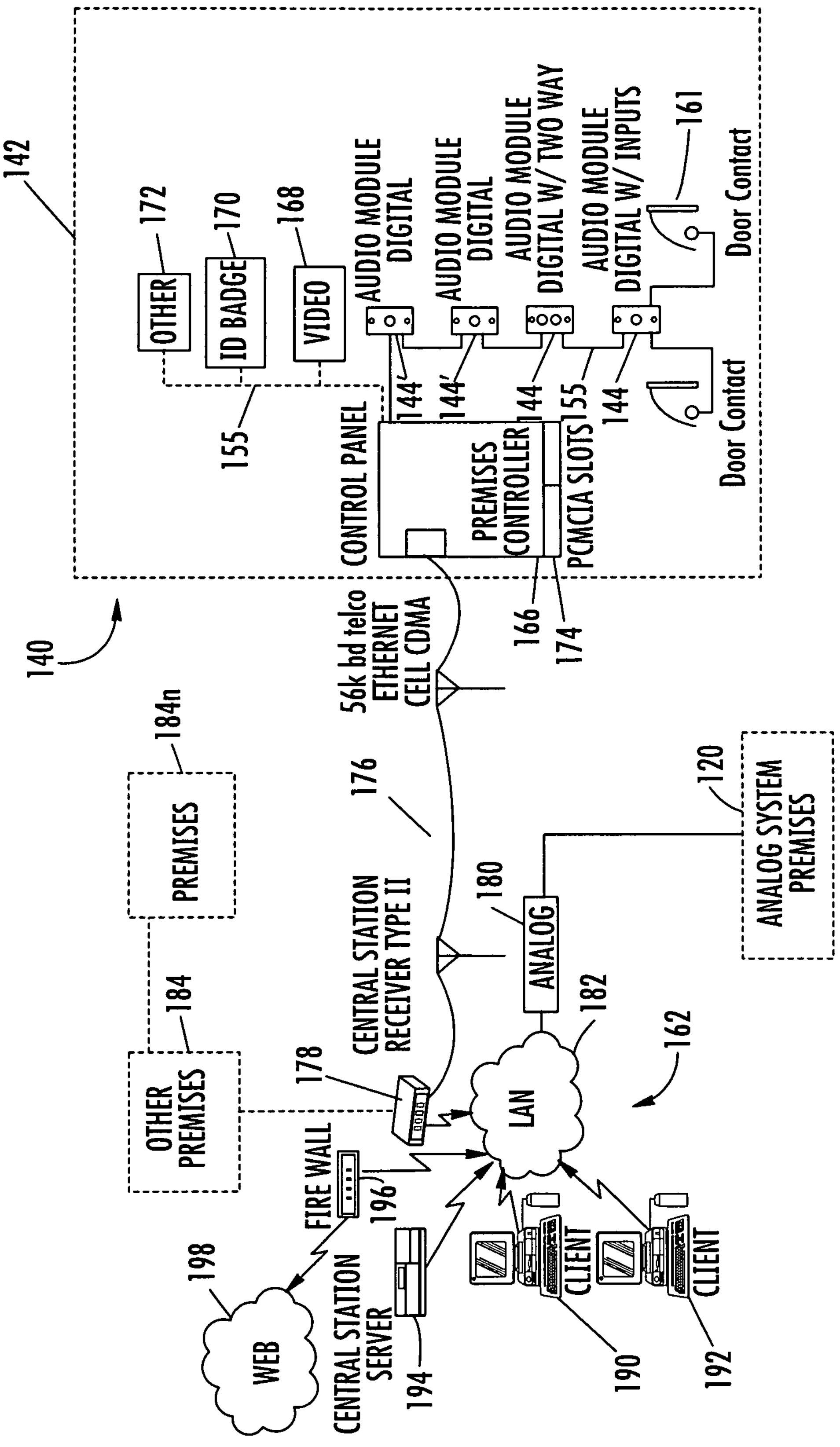

FIG. 6 is a fragmentary block diagram of a security system 140 at a premises 142 in which a processor, e.g., a microcontroller or other microprocessor, is formed as part of each audio sensor (also referred to as audio module), forming a digital audio module, sensor or microphone 144.

The audio sensor 144 is typically formed as an audio module with components contained within a module housing **144*a* that can be placed at strategic points within the premises 142. Different components include a microphone 146 that receives sounds from the premises. An analog/digital converter 148 receives the analog sound signals and converts them into digital signals that are processed within a processor 150, for example, a standard microcontroller such as manufactured by PIC or other microprocessor. This processing can occur at the central station in some embodiments, where the receiver such as shown in FIGS. 1-4 could have processing capability. The processor 150 can be operative with a memory 152 that includes a database of audio signatures 152 for comparing various sounds for determining whether any digitized audio signals are indicative of an alarm condition and should be forwarded to the central monitoring station. The memory 152 can store digital signatures of different audio sounds, typically indicative of an alarm condition (or a false alarm) and the processor can be operative for comparing a digitized audio signal with digital signals stored within the memory to determine whether an alarm condition exists. The audio sensor 144 can also receive data relating to audio patterns indicative of false alarms, allowing the processor 150 to recognize audio sounds indicative of false alarms. The processor 150 could receive such data from the central monitoring station through a transceiver 154 that is typically connected to a data bus 155** that extends through the premises into a premises controller as part of a control panel or other component.

The transceiver 154 is also connected into a digital/analog converter 156 that is connected to a speaker 158. It is possible for the transceiver 154 to receive voice commands or instructions from an operator located at the central monitoring station or other client location, which are converted by the processor 150 into analog voice signals. Someone at the premises could hear through the speaker 158 and reply through the microphone. It is also possible for the audio sensor 144 to be formed different such that the microphone could be separate from other internal components.

Figure 7:
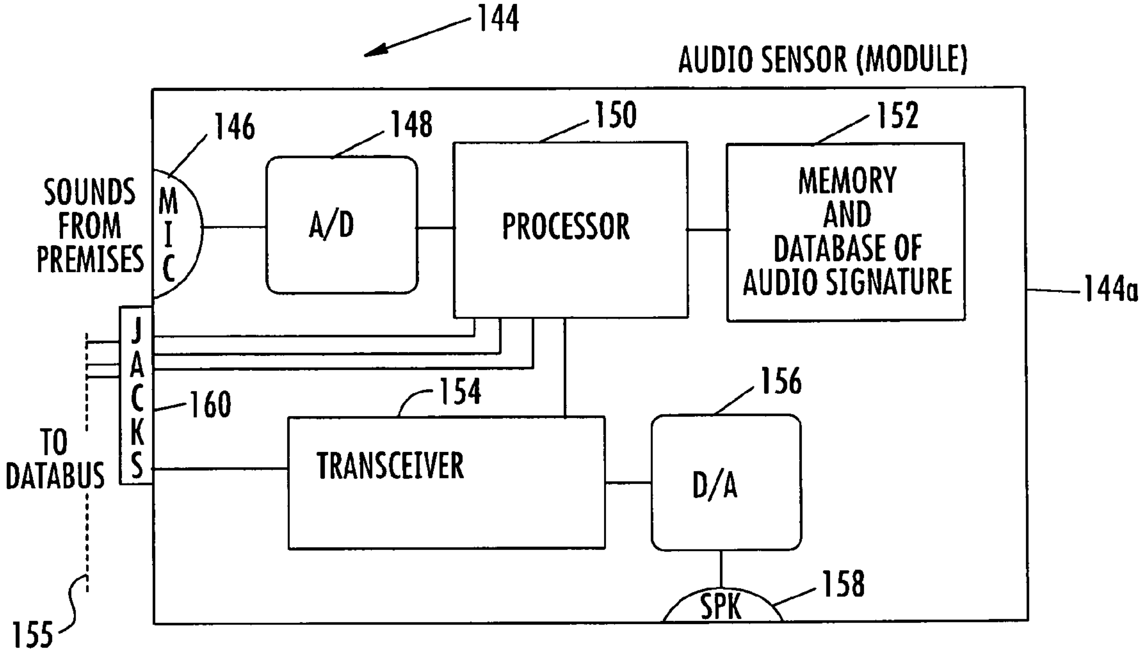

Although the audio sensor shown in FIG. 7 allows two-way communication, the audio sensor does not have to include such components as shown in FIG. 6, and could be an embodiment for an audio sensor 144' that does not include the transceiver 154, digital/analog converter 156, and speaker 158. This device could be a more simple audio sensor. Also, some digital audio sensors 144 could include a jack 160 that allows other devices to connect into the data bus 155 through the audio sensors and allow other devices such as a door contact 162 to connect and allow any signals to be transmitted along the data bus. It should be understood that all processing could be accomplished at the central receiver or other location distant from the premises.

Door contacts 161 and other devices can be connected into an audio sensor as a module. The audio sensor 144 could include the appropriate inputs as part of a jack 160 for use with auxiliary devices along a single data bus 155. Some audio modules 144 can include circuitry, for example, the transceiver 154 as explained above, permitting two-way communications and allowing an operator at a central monitoring station 162 or other location to communicate back to an individual located at the premises 142, for example, for determining false alarms or receiving passwords or maintenance testing. The system typically includes an open wiring topology with digital audio and advanced noise cancellation allowing a cost reduction as compared to systems such as shown in FIG. 5. Instead of wiring each audio sensor as a microphone back to the control panel as in the system shown in FIG. 5, the audio sensors are positioned on the addressable data bus 155, allowing each audio sensor and other device, such as door contacts, card readers or keyed entries to be addressable with a specific address.

It is possible to encode the audio at the digital audio sensor 144 and send the digitized audio signal to a premises controller 166 as part of a control panel in one non-limiting example, which can operate as a communications hub receiving signals from the data bus 55 rather than being operative as a wired audio control panel, such as in the system shown in FIG. 5. It should be understood that the premises can include an intellibase panel with IP capability as shown relative to FIGS. 1-4 and Ethernet capability. Thus, audio can be digitized at the audio sensor 144, substantially eliminating electrical noise that can occur from the wiring at the audio sensor to the premises controller 166. Any noise that occurs within the phone system is also substantially eliminated from the premises controller 166 to the central monitoring station 162. As shown in FIG. 6, a video camera 168, badge or ID card reader 170 and other devices 172 as typical with a security system could be connected into the data bus 155 and located within the premises 142.

Some digital phone devices multiplex numerous signals and perform other functions in transmission. As a result, a "pure" audio signal in analog prior art security systems, such as shown in FIG. 5, was not sent to the central monitoring station 130 along the contemporary phone network 128 when the 300 baud analog audio system was used. Some of the information was lost. In the system shown in FIG. 6, on the other hand, because digitization of the audio signal typically occurs at the audio sensor 144, more exact data is forwarded to the central monitoring station 162, and as a result, the audio heard at the central monitoring station is a better representation of the audio received at the microphone 146.

As shown in FIG. 6, the premises controller 166 can be part of a premises central panel, and can include PCMCIA slots 174. In another example, the premises controller 66 can be a stand-alone unit, for example, a processor, and not part of a control panel. In this non-limiting illustrated example, two PCMCIA slots 174 can be incorporated, but any number of slots and devices can be incorporated into a control panel for part of the premises controller 166. The slots can receive contemporary PC cards, modems, or other devices. The PCMCIA devices could transmit audio data at 56K modem speed across telephone lines, at higher Ethernet speeds across a data network, at a fast broadband, or wireless, for example, cellular CDMA systems. A communications network 176 extends between the premises controller 166 and the central monitoring station 162 and could be a wired or wireless communications network or a PSTN. The PCMCIA slots 174 could receive cellular or similar wireless transmitter devices to transmit data over a wireless network to the central monitoring station 162. As illustrated, a receiver 178 is located at the central monitoring station 162, and in this non-limiting example, is designated a central station receiver type II in FIG. 6 and receives the digitized audio signals. A receiver for analog audio signals from a control panel in the system 120 of FIG. 6 could be designated a central station receiver type I, and both receivers output digitized audio signals to a local area network 182. Other premises 184 having digital audio sensors 144 as explained above could be connected to receiver 178, such that a plurality of premises could be connected and digital audio data from various premises **184-184*n*** for "n" number of premises being monitored.

It is also possible to separate any receivers at the central monitoring station 162 away from any computer consoles used for monitoring a premises. A portion of the product required to be Underwriter Laboratory (UL) approved could possibly be the central station receiver 178. Any computer consoles as part of the central monitoring station could be connected to the local area network (LAN) 182. A central station server 194 could be operative through the LAN 182, as well as any auxiliary equipment. Because the system is digital, load sharing and data redirecting could be provided to allow any monitoring console or clients 190, 192 to operate through the local area network 182, while the central station server 194 allows a client/server relationship. A database at the central station server 194 can share appropriate data and other information regarding customers and premises. This server based environment can allow greater control and use of different software applications, increased database functions and enhanced application programming. A firewall 196 can be connected between the local area network 182 and an internet/worldwide web 198, allowing others to access the system through the web 198 and LAN 182 if they pass appropriate security.

Figure 8:
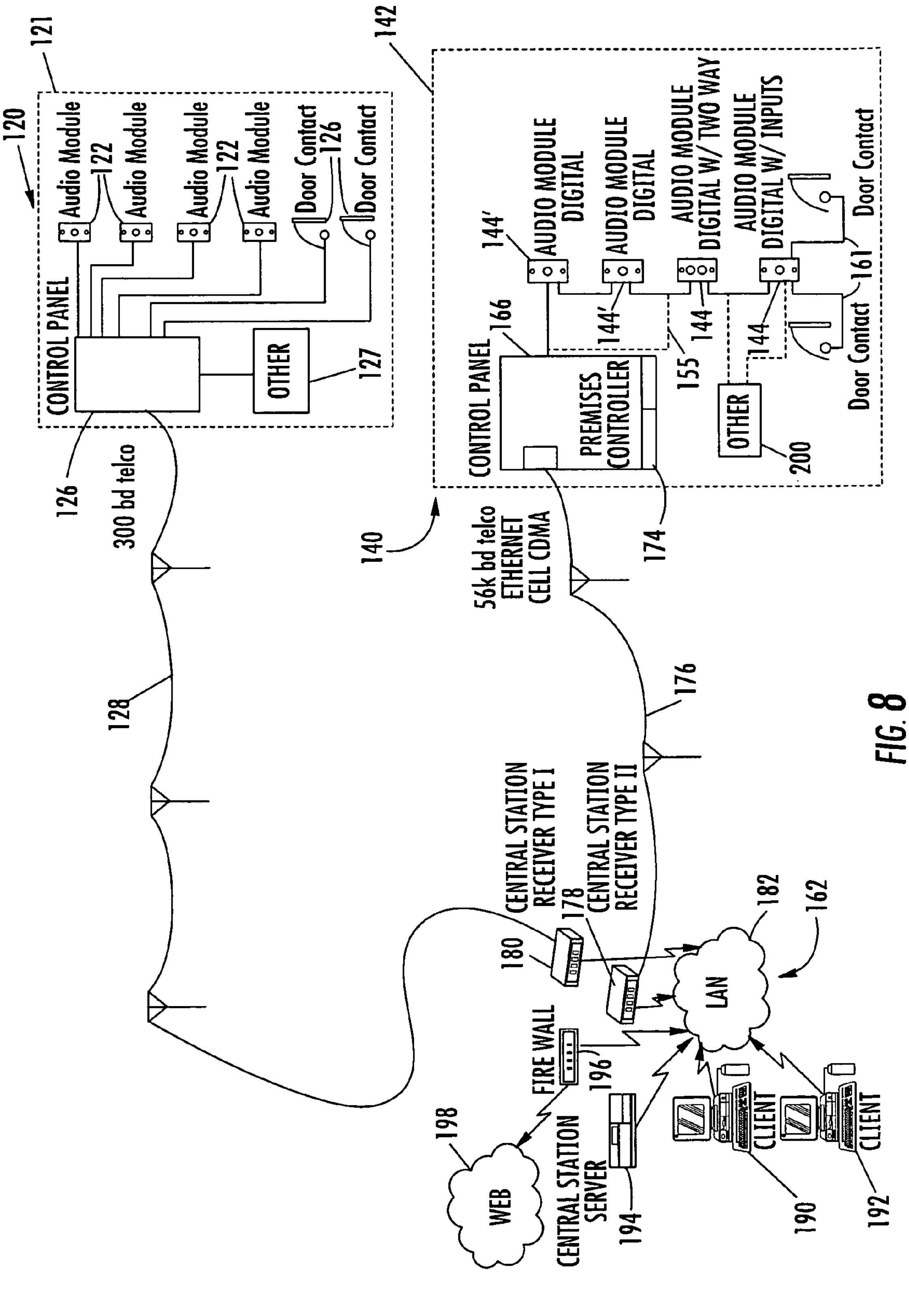

FIG. 8 is another view similar to FIG. 6, but showing a service to an installed customer base of a security system 180 with existing accounts, replacing some of the central monitoring station equipment for digital operation. The analog security system 120 is located at premises 121 and includes the typical components as shown in FIG. 5, which connect through the PSTN 128 to a central station receiver type I 180 for analog processing. Other devices 200 are shown with the digital security system 140 at premises 142. For existing security systems 120 that are analog based, the central station receiver type I 180 is operative with any existing and installed equipment in which analog signals are received from the analog audio modules 122, door contacts 126 or other devices 127, and transmitted through the control panel 126 at 300 baud rate over the telephone line 128. The system at premises 144, on the other hand, digitizes the analog sound picked up by audio sensors 144 transmits the digitized data into the central monitoring station 162 and into its local area network 182 via the premises controller 174. Data processing can occur at the premises controller 174, which is digitized and operative with the digital audio sensors 144. Data processing can occur at the central station.

At a central monitoring station 162, an operator typically sits at an operator console. The audio is received as digitized data from the digital audio sensors 144 and received at the central station receiver type II 178. Other analog signals from the analog audio modules 122, control panel 126 and telephone line 128 are received in a central station receiver type I 180. All data has been digitized when it enters the local area network (LAN) 182 and is processed at client consoles 190, 192. The clients could include any number of different or selected operators. Load sharing is possible, of course, in such a system, as performed by the central station server 194, such that a console typically used by one client could be used by another client to aid in load balancing.

Figure 9:
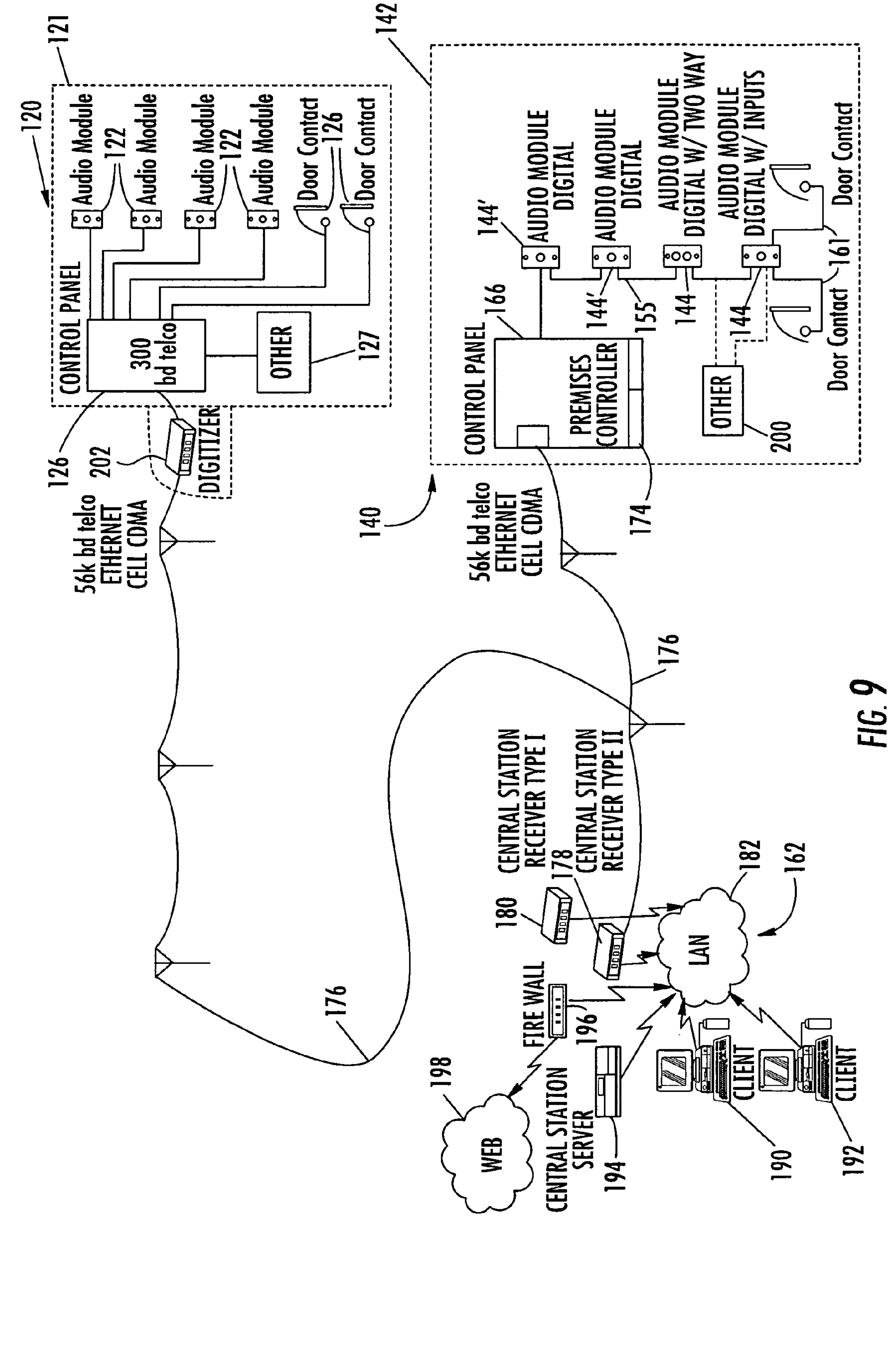

FIG. 9 shows the type of service that can be used for remote accounts when a phone problem exist at a premises 120, or along a telephone line in which it would be difficult to pass an analog audio signal at 300 baud rate from the control panel 126. A digitizer 202 is illustrated as operative with the control panel 126 and provides a remedy for the analog signals emanating from the control panel over a standard telephone line to the central monitoring station 162, when the signals cannot be received in an intelligible manner. The digitizer 202 digitizes the analog audio signal using appropriate analog-to-digital conversion circuitry and transmits it at a higher data rate, for example at a 56K baud rate to the central monitoring station 162. In other embodiments, the digitizer could transmit over an Ethernet network connection, or over a wireless CDMA cellular phone signal to the central monitoring station 162. The signal is received in a central station receiver type II 178, which is operative to receive the digital signals. This improved system using the digitizer 202 in conjunction with a more conventional system could be used in the rare instance when there is poor service over existing telephone lines. The digitizer 202 could be part of the control panel 126 within the premises or located outside the premises and connected to a telephone line.

Figure 10:
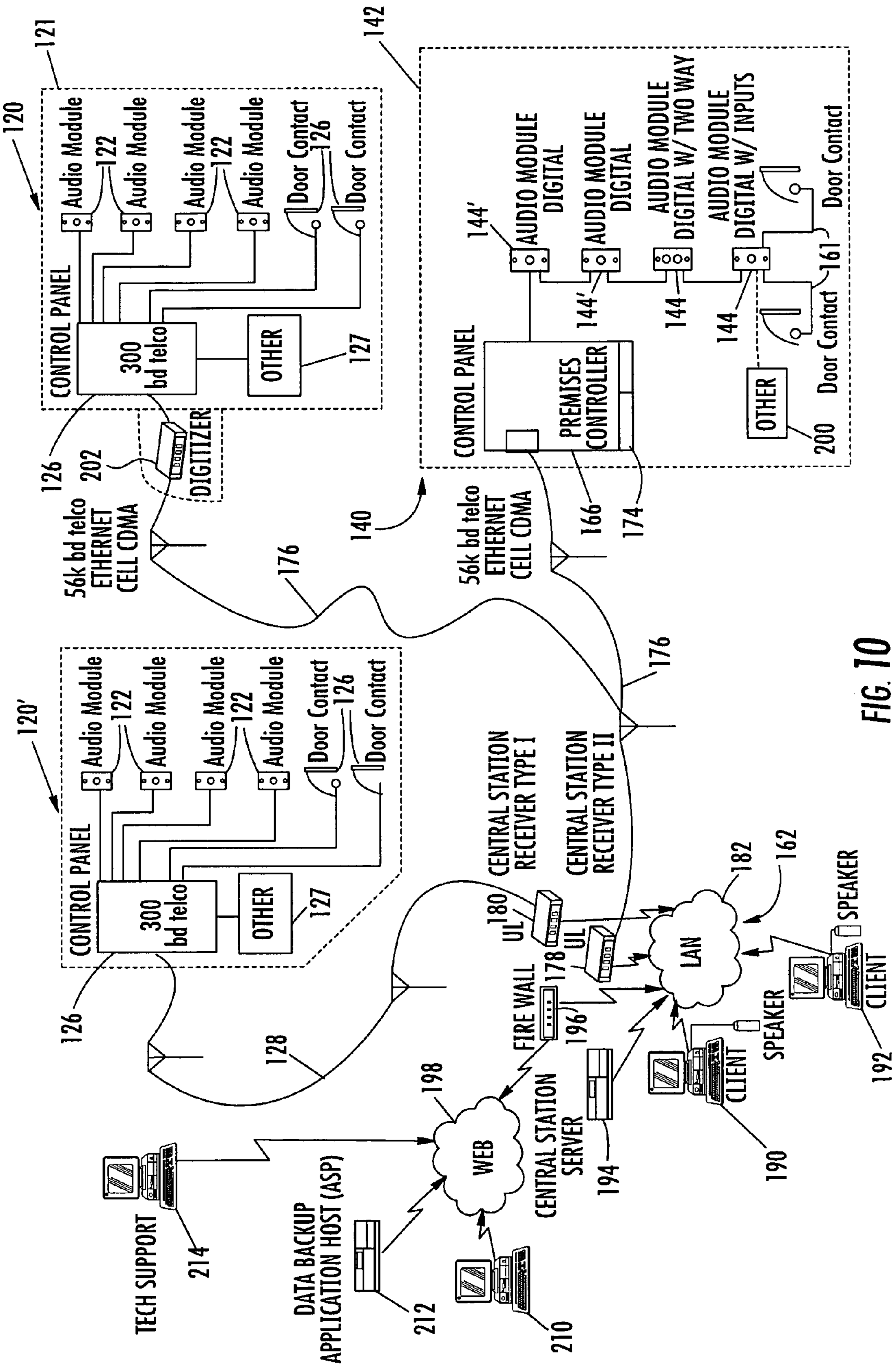

FIG. 10 shows different security systems 120, 120' and 140 in which legacy accounts using the analog audio modules 122 have been provided for through either the digitizer 202 that transmits signals to the central station receiver type II 178 or the use of the central station receiver type I 180, which receives the analog signals, such as from the security system 120'. Other individuals can connect to the central monitoring station 162 through the internet, i.e., worldwide web 198 as illustrated. For example, a remote client 210 could connect to the central station server 194 through the web 198, allowing access even from a home residence in some cases. Data backup could also be provided at a server 212 or other database that could include an application service provider (ASP) as an application host and operative as a web-based product to allow clients to obtain services and account information. Technical support 214 could be provided by another client or operator that connects through the web 198 into the system at the central monitoring station 162 to determine basic aspects and allow problem solving at different security systems. Because each audio sensor 144 is addressable on the data bus 155, it is possible to troubleshoot individual audio sensors 144 from a remote location, such as the illustrated clients 190, 192, 210 or technical support 214.

Problem accounts are also accounted for and software services provide greater client control, for example, for account information, including a client/server application at the application host 212, which can be a web-based product. Customers can access their accounts to determine security issues through use of the worldwide web/internet 198. Data can pass through the firewall 196 into the local area network 182 at the central monitoring station 162 and a customer or local administrator for a franchisee or other similarly situated individual can access the central station server 194 and access account information. It is also possible to have data back-up at the application host (ASP) 212 in cooperation with a client application operated by a system operator. Outside technical support 214 can access the central monitoring station 162 local area network 182 through the internet 198, through the firewall 196, and into the local area network 182 and access the central station server 194 or other clients 190, 192 on the local area network. Technical support can also access equipment for maintenance. The system as described relative to FIG. 10 can also allow account activation through the application host 212 or other means.

Figure 11:
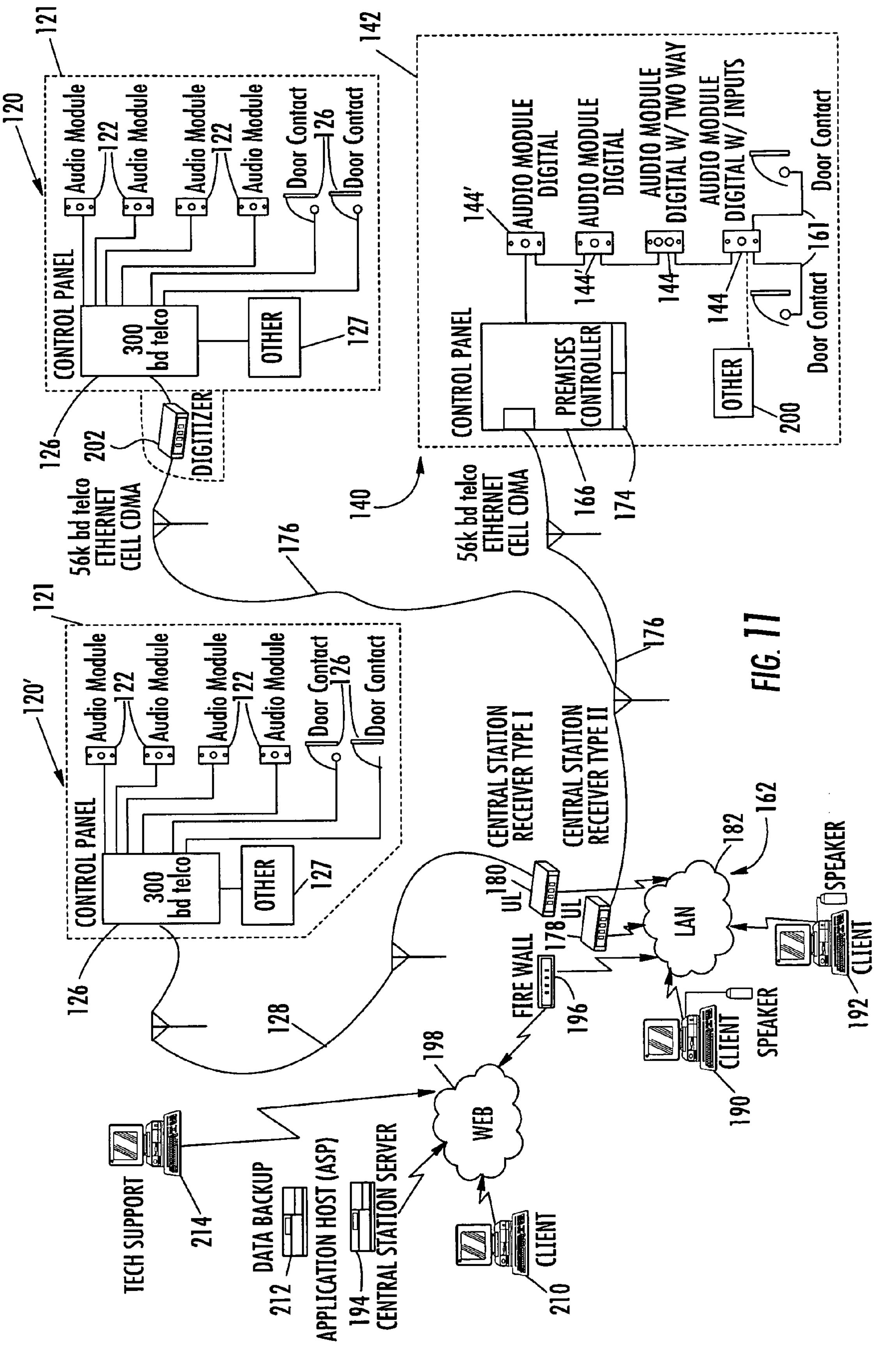

FIG. 11 shows a system with a different business model in which the central station server 194 is remote with the database and application host (ASP) 212 and accessed through the internet/web 198. The central station server 194 in this non-limiting example is connected to the internet 198 and different numbers of servers 194 could be connected to the internet to form a plurality of central monitoring stations, which can connect to different client monitoring consoles (with speakers for audio). Different client monitoring consoles could be owned by different customers, for example, dealers or franchisees. A corporate parent or franchiser can provide services and maintain software with updates 24/7 in an IP environment. Franchisees, customers or dealers could pay a service fee and access a corporate database.

Figure 12:
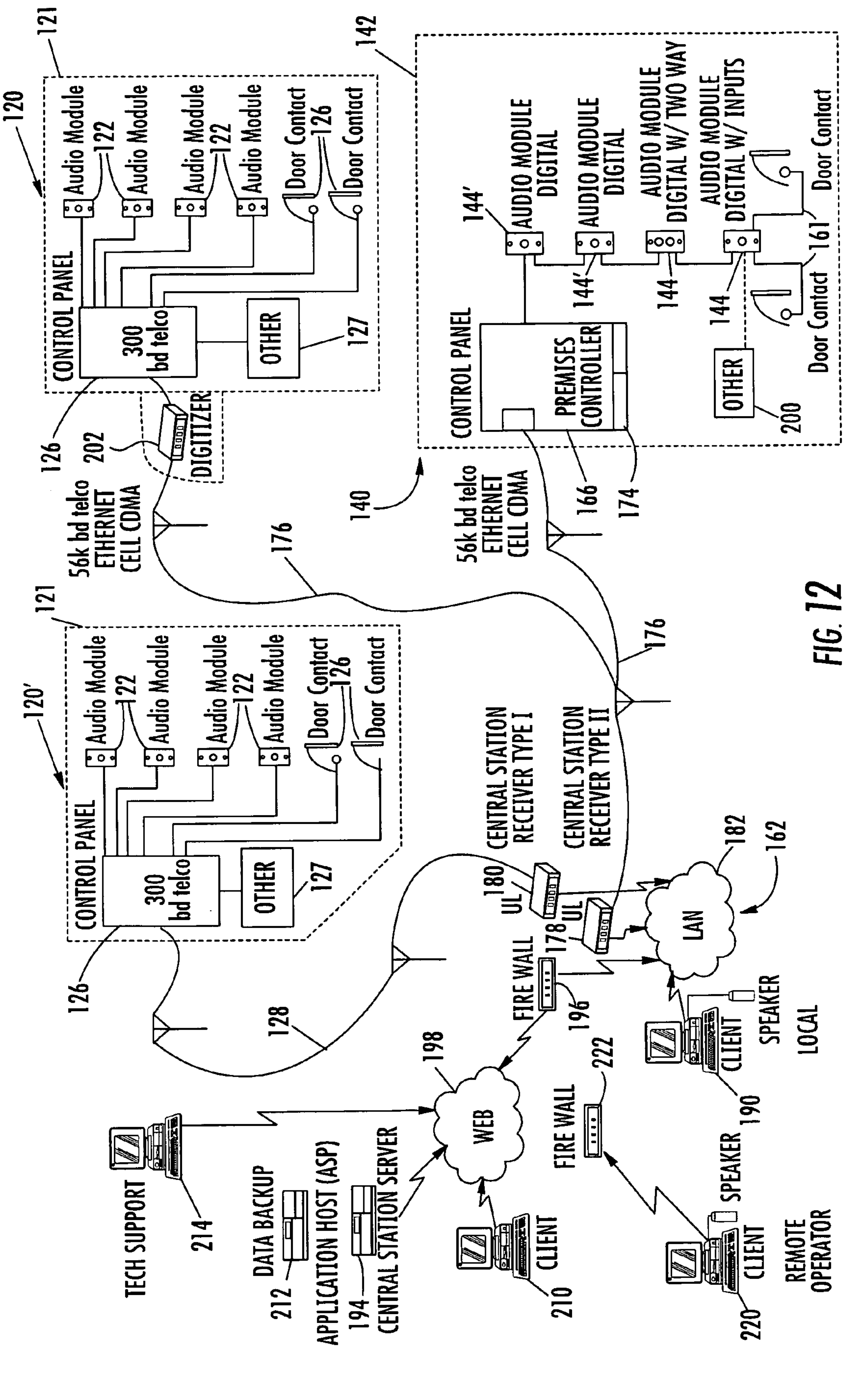

FIG. 12 shows that the system has the ability to monitor at a remote location, load share, late shift or back-up. A remote operator 220 as a client, for example, can connect through the internet 198 to the local area network 182. As illustrated, the remote client 220 is connected to the internet 198 via a firewall 222. Both clients 210, 220 connect to the web 198 and to the central monitoring station 182 via the firewall 196 and LAN 182. At the central monitoring station 162, if an operator does not show for work, load sharing can be accomplished and some of the balance of duties assumed by the clients 210, 220. Also, it is possible to monitor a client system for a fee. This could be applicable in disasters when a local monitoring station as a monitoring center goes down. Naturally, a number of local monitoring stations as monitoring centers could be owned by franchisees or run by customers/clients.

Figure 13:
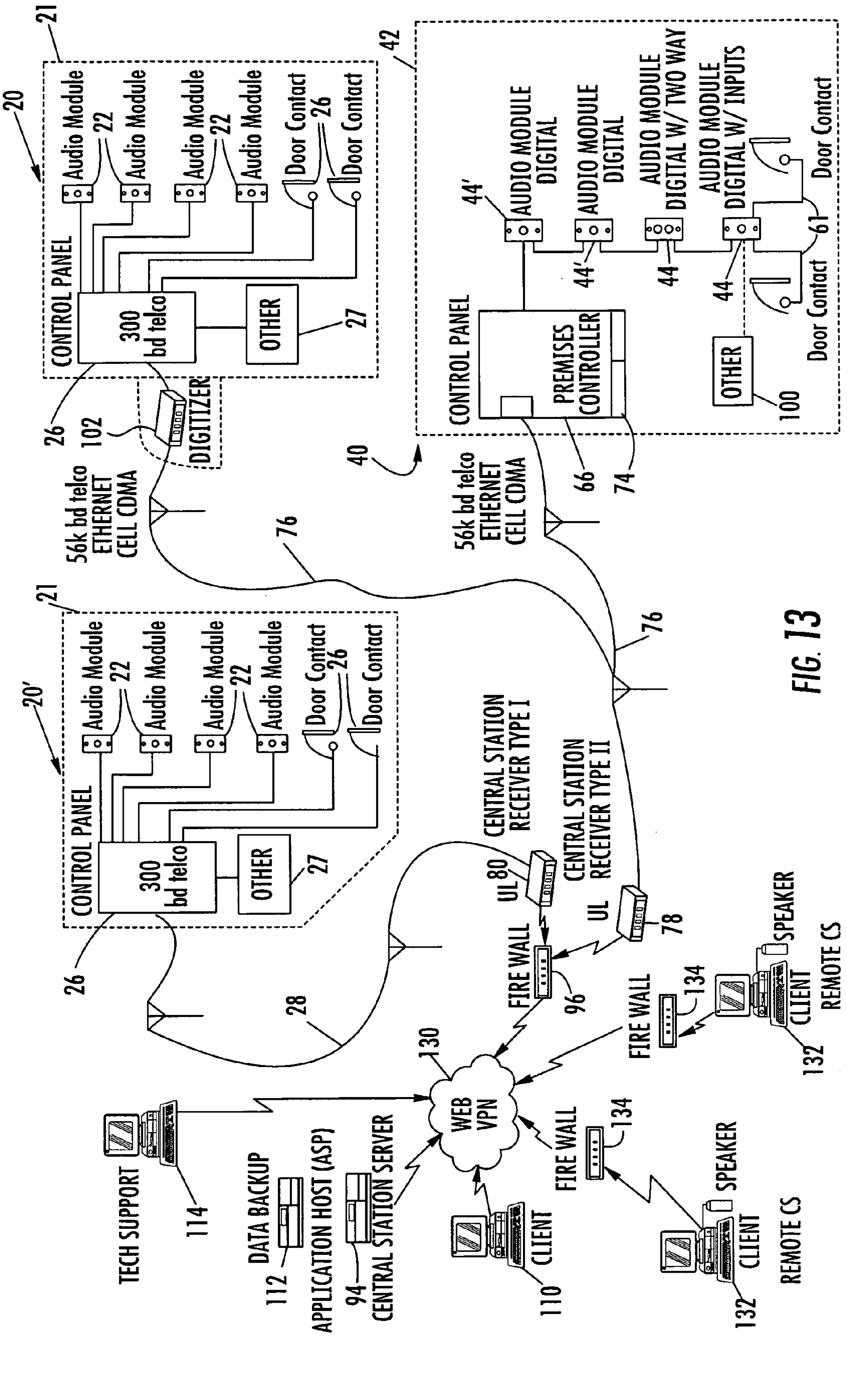

There may also be central monitoring stations owned or operated by a franchisee, which does not desire to monitor its site. It is possible to have monitoring stations in secure locations, or allow expansion for a smaller operator. With a web-based, broadband based station, it is possible to monitor smaller operators and/or customers, franchisees, or other clients and also locate a central monitoring station in a local region and do monitoring at other sites. It is also possible to use a virtual private network (VPN) 230, as illustrated in FIG. 13. Central monitoring station receiving equipment 132 as servers or computers could be remotely located for functioning as a central monitoring station (CS), which can be placed anywhere. For example, when a local control panel (premises controller) 166 activates, the system could call an 800 number or a local number and send data to the more local monitoring location where a central monitoring station 232 exists. Thus, it is possible to place a central monitoring station in the locality or city where the account is located and use the internet move data. This allows local phone service activation and reduces telephone infrastructure costs. It should be understood that the virtual private network 230 is not a weak link in the system and is operable to move data at high speeds. Appropriate firewalls 234 could be used.

Figure 14:
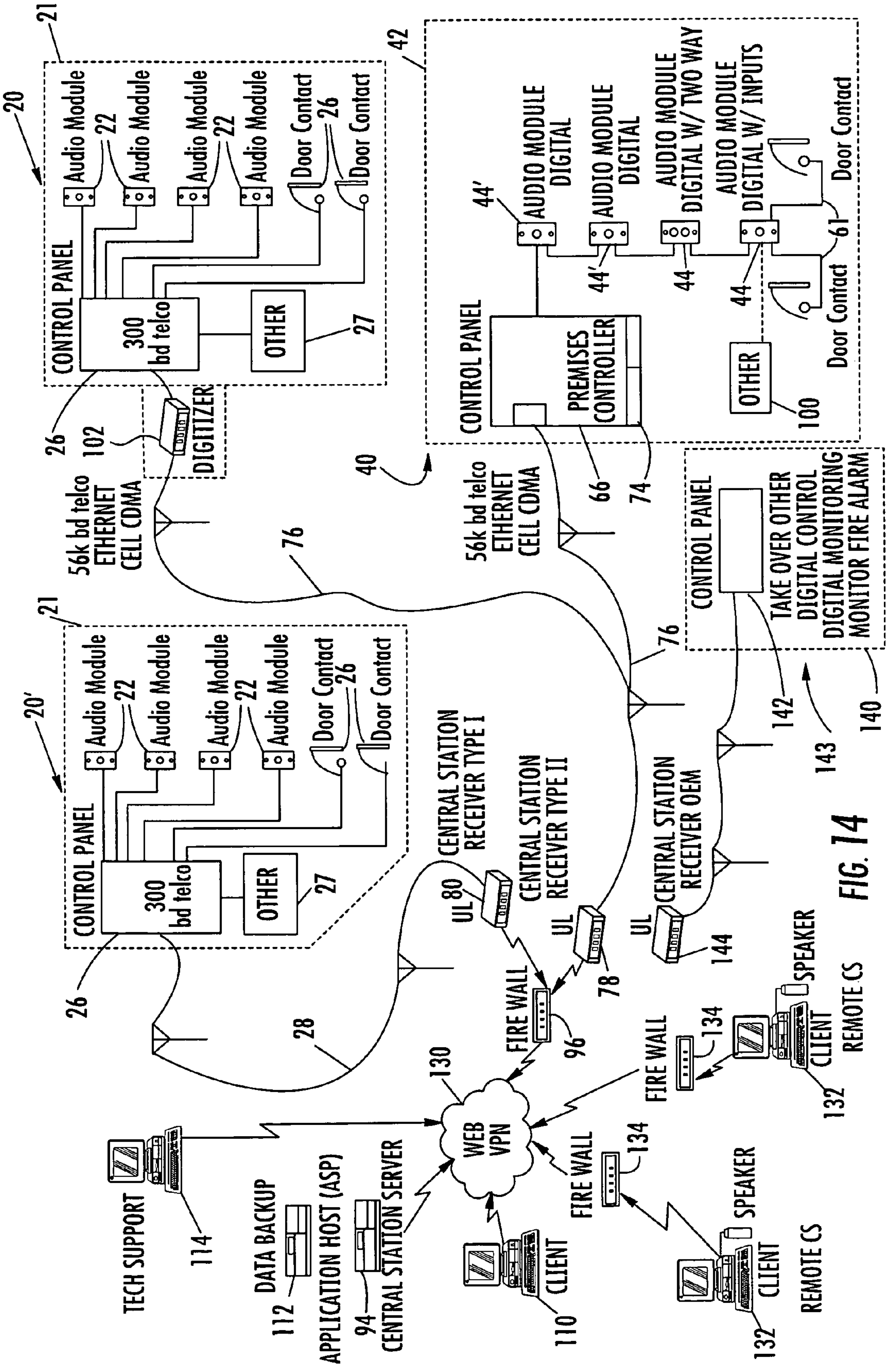

FIG. 14 shows that remote monitoring in the security system can be accomplished with any type of account, as shown by the premises at 240, which includes a control panel as a premises controller 242 for monitoring a security system 243 having a design different from the design of other security systems as described above. There could be some original equipment manufacturer accounts, for example, users of equipment manufactured by Tyco Electronics, Radionics Corporation or other equipment and device providers. It is possible in the security system to monitor control equipment provided by different manufacturers. This monitoring could be transparent to the central monitoring stations through an OEM central monitoring station receiver 244. It is possible with an appropriate use of software and an applicable receiver at the central monitoring station that any alarm system of a manufacturer could be monitored. This can be operative with the control panel as a premises controller, which can receive information from other digital security alarms. A central monitoring station receiver could be Underwriter Laboratory approved and operative as a central monitoring station receiver 244 for an original equipment manufacturer (OEM).

Figure 15:
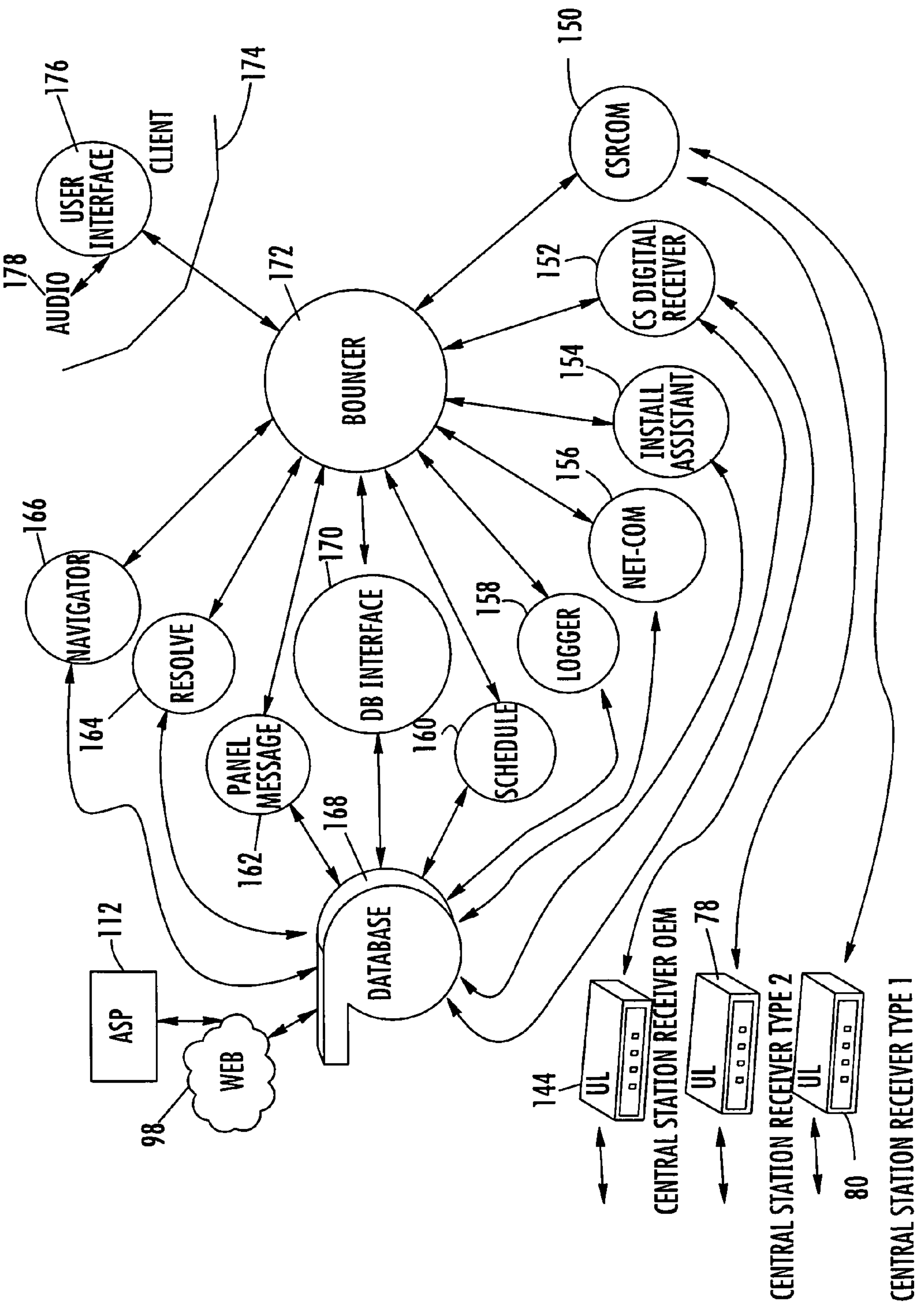

FIG. 15 is a logic diagram showing an example of software modules that could be used for the security system of the present invention. A central station receiver type I 180, central station receiver type II 178, and central station receiver OEM 244 are operative with respective central station receiver communications module 250 and central station digital receiver communications module 252. Other modules include an install assistance module 254 to aid in installing any software, a net communications module 256 that is operative to allow network communications, and a logger module 258 that is operable for logging data and transactions. A schedule module 260 is operable for scheduling different system aspects, and a panel message module 262 is operative for providing panel messages. Other modules include the resolve module 264 and navigator module 266. A database 268 is operative with a database interface 270, and a bouncer program 272 is also operable with the client 274 that includes a user interface 276 and audio 278. The database 268 can be accessed through the web 198 using the ASP 212 or other modules and devices as explained above. The bouncer 272 could be operative as a proxy and also act to "bounce" connections from one machine to another.

Figure 16:
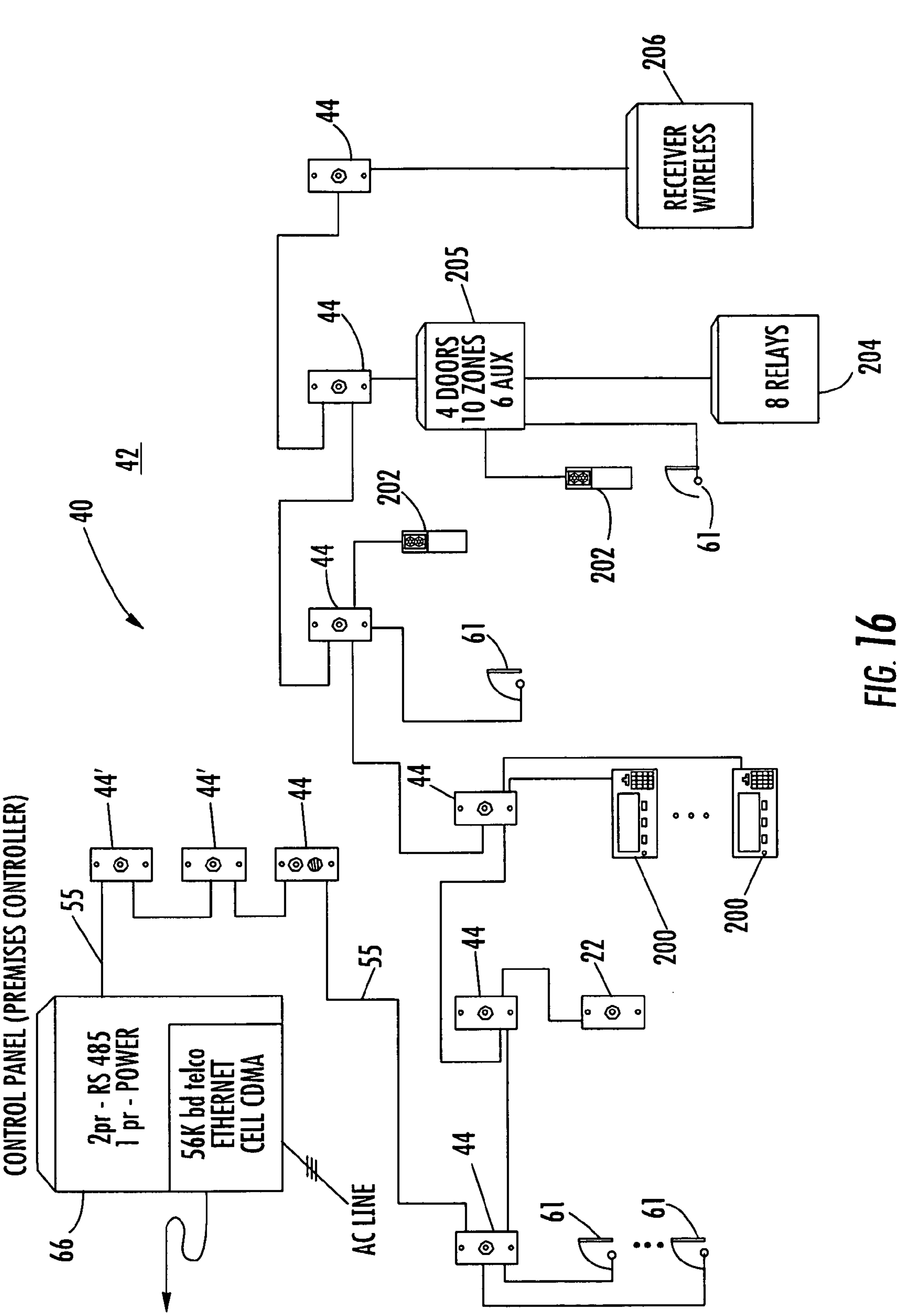

FIG. 16 shows different types of field equipment that can be used with a security system 140. As illustrated, field equipment for a monitored premises 142 is illustrated as connected on one data bus 155. The equipment includes audio sensors 144', door contacts 161, keypads 300 and card readers 302, which can connect on one bus 155 through other sensors 144. Some third party systems could be used, and relays 304 for zones 305 and wireless receivers 306 could be connected.

It should be understood that some pattern recognition can be done at the audio sensor 144 as a microphone with appropriate processing capability, but also pattern recognition could be done at the premises control panel or at the central station or a combination of these. For example, if common noises exceed a certain threshold, or if a telephone rings, in the prior art system using analog audio sensors 122 such as shown in FIG. 5, the noise could trip the audio. For example, a telephone could ring and the audio would trip any equipment central monitoring station, indicating an alarm. The operator would listen to the audio and conclude that a phone had rung and have to reset the system.

In the security system as illustrated, there is sufficient processing power at the audio sensor 144 with associated artificial intelligence (AI) to learn that the telephone is a nuisance as it recognizes when the phone rings and does not bother to transmit a signal back to the central monitoring station via the premises controller. There could be processing power at the central station for such functions if complicated audio sensors as described are not used.

There are a number of non-limiting examples of different approaches that could be used. For example, intrusion noise characteristics that are volume based or have certain frequency components for a certain duration and amplitude could be used. It is also possible to establish a learning algorithm such that when an operator at a central monitoring station 162 has determined if a telephone has rung, and resets a panel, an indication can be sent back to the digital audio sensor 144 that an invalid alarm has occurred. The processor 156 within the digital audio sensor 144 can process and store selected segments of that audio pattern, for example, certain frequency elements, similar to a fingerprint voice pattern. After a number of invalid alarms, which could be 5, 10 or 15 depending on selected processing and pattern determination, a built-in pattern recognition occurs at the audio sensor. A phone could ring in the future and the audio sensor 144 would not transmit an alarm.

Any software and artificial intelligence could be broken into different segments. For example, some of the artificial intelligence can be accomplished at the digital audio sensor 144, which includes the internal processing capability through the processor 150 (FIG. 6). Some software and artificial intelligence processing could occur at the control panel as the premises controller 166 or at the central station. For example, the digital audio sensor 144 could send a specific pattern back to the premises controller 166 or central monitoring station 162. In one scenario, lightning occurs with thunder, and every audio sensor 144 in many different premises as monitored locations could initiate an alarm signal as the thunder cracks. In a worse case scenario, a central monitoring station 162 would have to monitor, for example, 500 alarms simultaneously. These alarms must be cleared. Any burglar who desired to burglarize a premises would find this to be an opportune time to burglarize the monitored premises because the operator at a central monitoring station 162 would be busy clearing out the security system and would not recognize that an intruder had entered the premises.

An algorithm operable within the processor of the premises controller 166 can determine when all audio sensors 144 went off, and based on a characteristic or common signal between most audio sensors, determine that a lightning strike and thunder has occurred. It is also possible to incorporate an AM receiver or similar reception circuitry at the premises controller 166 as part of the control panel, which receives radio waves or other signals, indicative of lightning. Based upon receipt of these signals and that different audio sensors 144 generated signals, the system can determine that the nuisance noise was created by lightning and thunder, and not transmit alarm signals to the central monitoring station 162. This could eliminate a logjam at the central monitoring station and allow intrusion to be caught at the more local level.

The field equipment shown in FIG. 16 indicates that digital audio sensors 144 digitize the audio at the audio sensor and can perform pattern recognition on-board. Audio can also be stored at the audio sensor using any memory 152 (FIG. 6). Audio can also be streamed after an alarm signals. As illustrated, different devices are situated on one data bus and can interface to other devices to simplify wiring demands. These devices could be programmed and flash-updateable from the premises controller 166 or the event more remotely. There can also be different zones and relays.

The digital audio sensor 144 could include different types of microprocessors or other processors depending on what functions the digital audio sensor is to perform. Each audio sensor typically would be addressable on the data bus 155. Thus, an audio sensor location can be known at all times and software can be established that associates an audio sensor location with an alarm. It is also possible to interface a video camera 168 into the alarm system. When the system determines which audio sensor has signaled an alarm and audio has begun streaming, the digital signal could indicate at the premises controller 166 if there is an associated camera and whether the camera should be activated and video begin from that camera.

As indicated in FIG. 16, door contacts 162 could be connected to the digital audio sensor 44, enhancing overall security processing and wiring efficiency. Some rooms at a premises could have more than two audio sensors, for example, a digital audio sensor with the microprocessor, and another auxiliary sensor as a microphone 122, which could be analog. The signal from this microphone 122 could be converted by the digital audio sensor 144. Keypads 300 and keyless entries 302 could be connected to the digital audio sensor to allow a digital keypad input. There could also be different auxiliary inputs, including an audio sensor that receives analog information and inputs it into the digital audio sensor, which processes the audio with its analog-to-digital converter. Door contacts 162 can include auxiliary equipment and be connected into the digital audio sensor. The security system could include different relays 304 and zones 305 and auxiliary devices as illustrated. A wireless receiver 306 such as manufactured by RF Innovonics, could receive signals from the RF transmitters indicative of alarms from wireless audio digital sensors. This would allow a wireless alarm network to be established. There is also the ability to accomplish two-way communication on some of the digital audio sensors, in which the monitoring station could communicate back as explained above. It is also possible to communicate using Voice over Internet Protocol (VoIP) from the premises controller to the central monitoring station and in reverse order from the central monitoring station to a premises controller, allowing greater use of an IP network.

It should be understood that intrusion noises include a broad spectrum of frequencies that incorporate different frequency components, which typically cannot be carried along the phone lines as analog information. The phone lines are typically limited in transmission range to about 300 hertz to about 3,300 hertz. By digitizing the audio signals, the data can be transmitted at higher frequency digital rates using different packet formats. Thus, the range of frequencies that the system can operate under is widened, and better information and data is transmitted back to the central monitoring station, as compared to the analog security system such as shown in FIG. 5.

Figure 17:
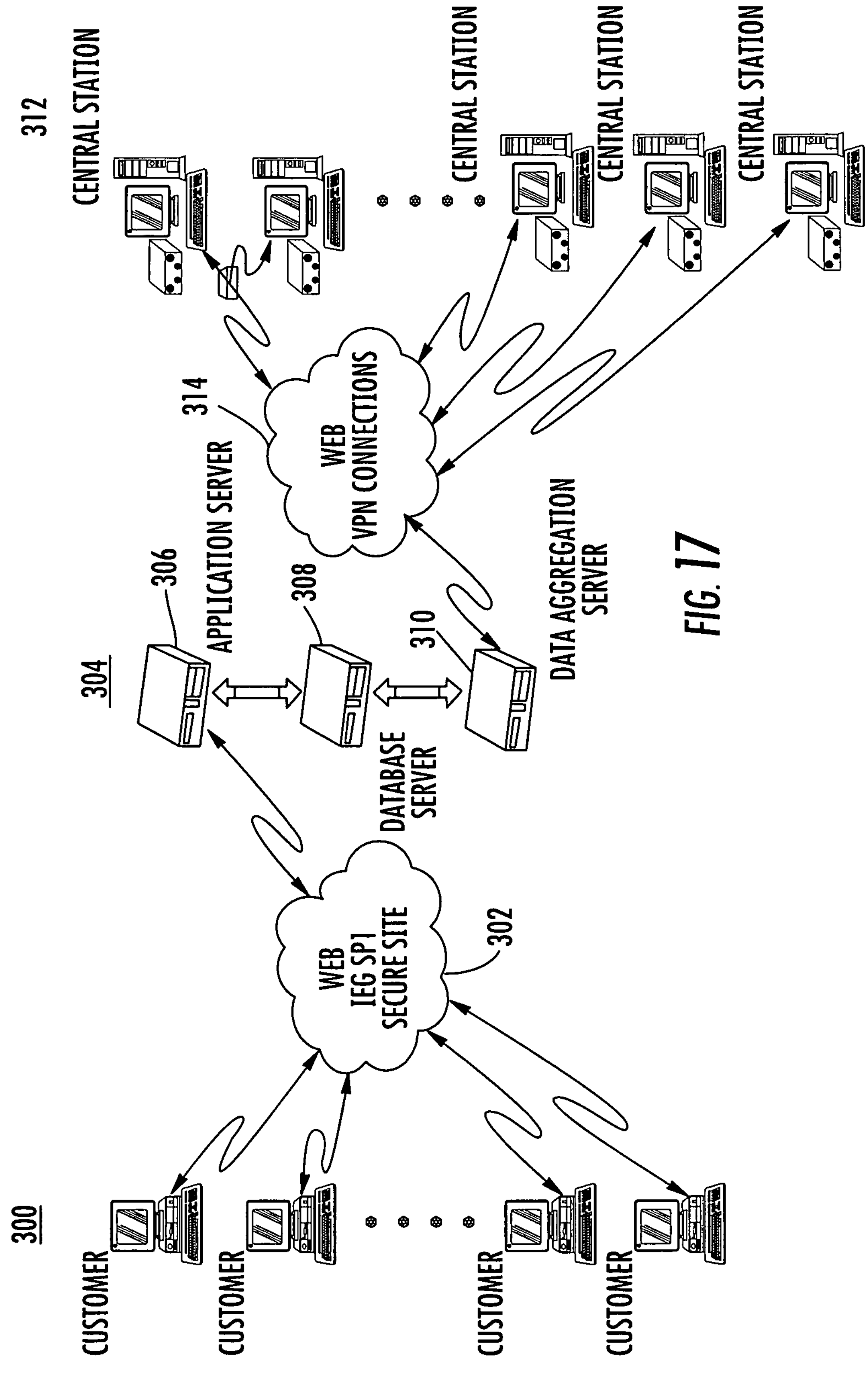

FIG. 17 shows the security system 140 in which customers 400 can interact with a web IEG SP1 secure site 402, which in turn is operative with a colocation facility 404, such as a Verio facility, including an application server 406 database server 408 and data aggregation server 410. These servers connect to various remote central monitoring stations 412 through a web VPN network 414. Advanced Suite software could be used.

Enhanced operating efficiency could include load balancing, decreased activations, decreased misses, increased accounts per monitor, and integrated digital capability for the alarm system. Disaster recovery is possible with shared monitoring, for example, on nights and weekends. This enables future internet protocol or ASP business modules. The existing wired control panel used in prior art systems is expensive to install and requires difficult programming. It has a high cost to manufacture and requires analog technology.

The premises controller 166 as part of a control panel is operative with digitized audio and designed for use with field equipment having addressable module protocols. The 300 baud rate equipment, such as explained with reference to FIG. 5, can be replaced with devices that fit into PCMCIA slots and operative at 56K or higher rates. Written noise canceling algorithms can enhance digital signal processing. This design can be accomplished with a contemporary microcontroller (or microprocessor). The system also supports multiple communications media including telephone company, DSL, cable modem and a digital cellular systems. It enables a series topology with full digital support. There is a lower cost to manufacture and about 40% reduction in the cost of a control panel in one non-limiting example. It also allows an interface for legacy control panels and digital audio detection and verification. It allows increased communication speeds. It is IP ready and reduces telephone company infrastructure costs.

There are many benefits, which includes the digitizing of audio at the audio sensors. Digital signal processing can occur at the audio sensor, thus eliminating background noise at the audio sensor. For example, any AC humming could be switched on/off, as well as other background noises, for example a telephone or air compressor noise. It is also possible to reduce the audio to a signature and recognize a likely alarm scenario and avoid false alarm indications for system wide noise, such as thunder. The digital audio sensors could record five seconds of audio data, as one non-limiting example, and the premises controller as a control panel can process this information. With this capability, the central monitoring station would not receive 25 different five-second audio clips to make a decision, for example, which could slow overall processing, even at the higher speeds associated with advanced equipment. Thus, a signature can be developed for the audio digital sensor, containing enough data to accomplish a comparison at the premises controller for lightning strikes and thunder.

Although some digital audio can be stored at the premises controller of the control panel or a central monitoring station, it is desirable to store some audio data at the digital audio sensors. The central monitoring station can also store audio data on any of its servers and databases. This storage of audio data can be used for record purposes. Each audio sensor can be a separate data field. Any algorithms that are used in the system can do more than determine amplitude and sound noise level, but can also process a selected frequency mix and duration of such mix.

There can also be progressive audio. For example, the audio produced by a loud thunder strike could be processed at the digital audio sensor. Processing of audio data, depending on the type of audio activation, can also occur at the premises controller at the control panel or at the central monitoring station. It is also possible to have a database server work as a high-end server for greater processing capability. It is also possible to use digital verification served-up to a client PC from a central monitoring station server. This could allow intrusion detection and verification, which could use fuzzy logic or other artificial intelligence.

The system could use dual technology audio sensors, including microwave and passive infrared (PIR) low energy devices. For example, there could be two sets of circuitry. A glass could break and the first circuitry in the audio sensor could be operative at microamps and low current looks for activation at sufficient amplitude. If a threshold is crossed, the first circuitry, including a processor, initiates operation of other circuitry and hardware, thus drawing more power to perform a complete analysis. It could then shut-off. Any type of audio sensors used in this system could operate in this manner.

The circuit could include an amplitude based microphone such that when a threshold is crossed, other equipment would be powered, and the alarm transmitted. It could also shut itself off as a two-way device. It is possible to have processing power to determine when any circuitry should arm and disarm or when it should "sleep."

As noted before, there can be different levels of processing power, for example at the (1) audio sensor, (2) at the premises controller located the control panel, or (3) the central monitoring station, where a more powerful server would typically be available and in many instances preferred. The system typically eliminates nuisance noise and in front of the physical operator at a central monitoring station. Any type of sophisticated pattern recognition software can be operable. For example, different databases can be used to store pattern recognition "signatures." Digital signal processing does not have to occur with any type of advanced processing power but can be a form of simplified A/D conversion at the microphone. It is also not necessary to use Fourier analysis algorithms at the microphone.

This application is related to copending patent application entitled, "SYSTEM AND METHOD FOR MONITORING SECURITY AT A PREMISES USING LINE CARD," which is filed on the same date and by the same assignee and inventors, the disclosures which is hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A security system for monitoring security within at least one premises, comprising:

at least one audio sensor and an alarm panel connected to the audio sensor and each located at the premises that generate alarm report data, wherein the alarm panel transmits the alarm report data through a communications network connected thereto; and at least one alarm receiver located at central station remote from the premises that receives the alarm report data transmitted from the alarm panel through the communications network and comprising a line card that receives the alarm report data and an alarm receiver processor that receives and processes regulated alarm report data in accordance with Underwriter Laboratories 1610 requirements, and further comprising a central station automation system, wherein said line card is operable for receiving non-regulated alarm report data that is not regulated in accordance with Underwriter Laboratories 1610 requirements, said line card comprising a secondary communications channel interfaced to said central station automation system, wherein the line card routes the non-regulated alarm report data to the central station automation system over the secondary communications channel and bypasses the alarm receiver processor.

2. The security system according to claim 1, wherein said secondary communications channel comprises a single Ethernet connection with said central station automation system.

3. The security system according to claim 1, wherein the non-regulated alarm report date comprises at least one of digitized audio and control messages.

4. The security system according to claim 1, wherein said regulated alarm report data comprises at least one of account data from the premises, audible or visible annunciation of an alarm report, and acknowledgements.

5. The security system according to claim 1, wherein said alarm report data comprises audio data collected at said at least one audio sensor and transmitted from said alarm panel.

6. The security system according to claim 1, wherein said alarm panel is operative for digitally encoding alarm report data and transmitting the digitally encoded alarm report data across the communications network.

7. The security system according to claim 6, wherein said line card comprises a modem processor that forwards the digitally encoded alarm report data to the central station automation system.

8. The security system according to claim 1, wherein said line card further comprises a modem processor for receiving alarm report data from legacy alarm panels as analog communications signals using Frequency Shift Keying (FSK) signaling, and digitizing the analog communications signals as digitally encoded data and forwarding the digitally encoded data to the central station automation system.

9. The security system according to claim 8, wherein the line card further comprises a terminator circuit having a plurality of analog front end devices and communications interface devices for interfacing with a communications network comprising a public switched telephone network (PSTN).

10. The security system according to claim 1, wherein said line card establishes a bi-directional link for the non-regulated alarm report data between the central station automation system and the alarm panel without using the alarm receiver processor until the bi-directional link is no longer required.

11. The security system according to claim 10, wherein the bi-directional link comprises audio data transmitted back and forth between the central station and the premises.

12. The security system according to claim 10, wherein said bi-directional link is terminated when a central station operator determines that the bi-directional link is no longer required.

13. A central station alarm receiver, comprising:

a receiver backplane;

a line card that receives regulated and non-regulated alarm report data transmitted over a communications network from an alarm panel located at a premises, wherein the regulated alarm report data is in accordance with Underwriter Laboratories 1610 requirements and said non-regulated alarm report data is not regulated in accordance with Underwriter Laboratories 1610 requirements;

an alarm receiver processor that receives and processes regulated alarm report data; and wherein said line card further comprises a secondary communications channel, wherein the line card routes the non-regulated alarm report data to the central station automation system over the secondary communications channel and bypasses the alarm receiver processor.

14. The central station alarm receiver according to claim 13, wherein said secondary communications channel comprises a single Ethernet connection with said central station automation system.

15. The central station alarm receiver according to claim 13, wherein the non-regulated alarm report date comprises at least one of digitized audio and control messages.

16. The central station alarm receiver according to claim 13, wherein said regulated alarm report data comprises at least one of account data from the premises, audible or visible annunciation of an alarm report, and acknowledgements.

17. The central station alarm receiver according to claim 13, wherein said alarm report data comprises audio information collected at an audio sensor and transmitted from an alarm panel.

18. The central station alarm receiver according to claim 13, wherein said line card comprises a modem processor that processes digitally encoded alarm report data that had been received from an alarm panel.

19. The central station alarm receiver according to claim 13, wherein said line card further comprises a modem processor for receiving alarm report data from legacy alarm panels as analog communications signals using Frequency Shift Keying (FSK) signaling, and digitizing the analog communications signals as digitally encoded data and forwarding the digitally encoded data to a central station automation system.

20. The central station alarm receiver according to claim 19, wherein line card further comprises a terminator circuit having a plurality of analog front end devices and communications interface devices for interfacing with a communications network comprising a public switched telephone network (PSTN).

21. The central station alarm receiver according to claim 13, wherein said line card and alarm receiver processor are operable for establishing a bi-directional link for non-regulated alarm report data between the central station automation system and the alarm panel at the premises until the bi-directional link is no longer required.

22. The central station alarm receiver according to claim 21, wherein the bi-directional link comprises audio data transmitted back and forth between the central station and the premises.

23. The central station alarm receiver according to claim 21, wherein the bi-directional link is terminated when a central station operator determines that the bi-directional link is no longer required.

24. A method for monitoring security within at least one premises, comprising:

generating alarm report data from at least one audio sensor and an alarm panel connected to the audio sensor and each located at the premises; and transmitting the alarm report data through a communications network to at least one alarm receiver located at a central station remote from the premises and which includes a line card that receives the alarm report data and an alarm receiver processor that receives and processes regulated alarm report data in accordance with Underwriter Laboratories 1610 requirements, and further comprising a central station automation system, wherein said line card is operable for receiving non-regulated alarm report data that is not regulated in accordance with Underwriter Laboratories 1610 requirements, said line card comprising a secondary communications channel interfaced to said central station automation system, wherein the line card routes the non-regulated alarm report data to the central station automation system over the secondary communications channel and bypasses the alarm receiver processor.

25. The method according to claim 24, wherein the secondary communications channel comprises a single Ethernet connection with said central station automation system.

* * * * *